United States Patent
Ogino

(10) Patent No.: US 12,344,274 B2
(45) Date of Patent: Jul. 1, 2025

(54) VEHICLE TRAVELING CONTROL APPARATUS

(71) Applicant: SUBARU CORPORATION, Tokyo (JP)

(72) Inventor: Shuu Ogino, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 93 days.

(21) Appl. No.: 17/493,658

(22) Filed: Oct. 4, 2021

(65) Prior Publication Data

US 2022/0105957 A1 Apr. 7, 2022

(30) Foreign Application Priority Data

Oct. 2, 2020 (JP) .................................. 2020-168083

(51) Int. Cl.
*B60W 60/00* (2020.01)
*B60W 30/18* (2012.01)
(Continued)

(52) U.S. Cl.
CPC .. *B60W 60/0015* (2020.02); *B60W 30/18109* (2013.01); *B60W 60/0059* (2020.02);
(Continued)

(58) Field of Classification Search
CPC ......... B60W 60/0015; B60W 60/0059; B60W 30/18109; B60W 2554/4046; B60W 2554/4049; G06V 20/58; B62D 15/021
See application file for complete search history.

(56) References Cited

U.S. PATENT DOCUMENTS 9,463,795 B2 * 10/2016 Minemura ............. B60Q 9/008
9,849,865 B2 * 12/2017 Kwon ....................... B60T 7/22
(Continued)

FOREIGN PATENT DOCUMENTS

CN 110481544 B * 11/2020
JP H10-308000 A 11/1998
(Continued)

OTHER PUBLICATIONS

"Ryuzo Hayashi, Juzo Isogai, Pongsathorn Raksincharoensak, Masao Nagai; Autonomous collision avoidance system by combined control of steering and braking using geometrically optimised vehicular trajectory; 2012; Vehicle System Dynamics" (Year: 2012).*
(Continued)

*Primary Examiner* — Elaine Gort
*Assistant Examiner* — Christopher R Cardimino
(74) *Attorney, Agent, or Firm* — TROUTMAN PEPPER LOCKE LLP

(57) ABSTRACT

A vehicle traveling control apparatus includes an autonomous sensor, a braking controller, a determination unit, a calculator, and a steering controller. The autonomous sensor recognizes an obstacle ahead of a vehicle. The braking controller determines possibility of contact on the basis of a relative distance and a relative speed between the vehicle and the obstacle, and, upon determining that the vehicle is likely to contact the obstacle, executes a strong braking control of reducing the relative speed to "0". The determination unit calculates a predicted travel distance to be traveled until the relative speed is reduced to "0", and permits steering intervention when the predicted travel distance is longer than the relative distance. The calculator calculates time-to-contact to be taken until the vehicle contacts the obstacle. The steering controller executes a
(Continued)

steering control when the steering intervention is permitted and the time-to-contact becomes a time threshold or less.

15 Claims, 16 Drawing Sheets

(51) Int. Cl.
*B62D 15/02* (2006.01)
*G06V 20/58* (2022.01)

(52) U.S. Cl.
CPC .......... *B62D 15/021* (2013.01); *G06V 20/58* (2022.01); *B60W 2554/4046* (2020.02); *B60W 2554/4049* (2020.02)

(56) References Cited

U.S. PATENT DOCUMENTS

| | | | | |
|---|---|---|---|---|
| 10,000,237 | B2* | 6/2018 | Katoh | B60W 30/12 |
| 10,882,518 | B2* | 1/2021 | Saiki | B62D 15/0265 |
| 10,953,882 | B2* | 3/2021 | Fujii | B62D 15/0265 |
| 11,027,734 | B2* | 6/2021 | Ke | B60W 50/045 |
| 11,214,267 | B2* | 1/2022 | Ike | B60W 50/14 |
| 2009/0143951 | A1* | 6/2009 | Takahashi | B60W 30/09 |
| | | | | 701/70 |
| 2012/0022759 | A1* | 1/2012 | Inoue | B60T 7/22 |
| | | | | 701/70 |
| 2013/0297173 | A1* | 11/2013 | Takagi | B60W 30/06 |
| | | | | 701/70 |
| 2019/0001937 | A1* | 1/2019 | Ito | B60W 30/09 |
| 2020/0023901 | A1* | 1/2020 | Modig | B62D 15/0265 |
| 2020/0282983 | A1* | 9/2020 | Ito | B60T 7/12 |
| 2022/0203942 | A1* | 6/2022 | Aurand | B60T 7/12 |

FOREIGN PATENT DOCUMENTS

| | | | |
|---|---|---|---|
| JP | 2009-101756 A | | 5/2009 |
| JP | 2015134583 A | * | 7/2015 |
| JP | 2017-075881 A | | 4/2017 |
| JP | 2017081232 A | * | 5/2017 |
| JP | 2017-114427 A | | 6/2017 |
| JP | 2019-172113 A | | 10/2019 |

OTHER PUBLICATIONS

"David Llorca, Vicente Milanés, Ignacio Parra, Miguel Gavilán, Iván García Daza, et al.. Autonomous Pedestrian Collision Avoidance Using a Fuzzy Steering Controller; 2011; IEEE Transactions on Intelligent Transportation Systems" (Year: 2011).*

Japanese Office Action issued in corresponding Japanese Patent Appln. No. 2020-168083, dated Jul. 2, 2024, related to U.S. Appl. No. 17/493,658, with English translation.

* cited by examiner

FIRST MAP FOR SETTING OF SECONDARY BRAKING CONTROL START DISTANCE

| RELATIVE SPEED (km/h) \ OVERLAP RATIO (%) | 0 | 10 | 20 | 30 | 40 | 50 | 70 | 100 | 120 | 150 |
|---|---|---|---|---|---|---|---|---|---|---|
| 0 | 0.00 | 0.00 | 0.00 | 0.00 | 0.00 | 0.00 | 0.00 | 0.00 | 0.00 | 0.00 |
| 5 | 0.00 | ... | ... | ... | ... | ... | ... | ... | ... | ... |
| 10 | 0.00 | ... | ... | ... | ... | ... | ... | ... | ... | ... |
| 15 | 0.00 | ... | ... | ... | ... | ... | ... | ... | ... | ... |
| 20 | 0.00 | ... | ... | ... | ... | ... | ... | ... | ... | ... |
| 30 | 0.00 | ... | ... | ... | ... | ... | ... | ... | ... | ... |
| 40 | 0.00 | ... | ... | ... | ... | ... | ... | ... | ... | ... |
| 50 | 0.00 | ... | ... | ... | ... | ... | ... | ... | ... | ... |
| 60 | 0.00 | ... | ... | ... | ... | ... | ... | ... | ... | ... |
| 70 | 0.00 | ... | ... | ... | ... | ... | ... | ... | ... | ... |
| 80 | 0.00 | ... | ... | ... | ... | ... | ... | ... | ... | ... |
| 110 | 0.00 | ... | ... | ... | ... | ... | ... | ... | ... | ... |
| 150 | 0.00 | ... | ... | ... | ... | ... | ... | ... | ... | ... |

VEHICLE TRAVELING CONTROL APPARATUS

CROSS-REFERENCE TO RELATED APPLICATION

The present application claims priority from Japanese Patent Application No. 2020-168083 filed on Oct. 2, 2020, the entire contents of which are hereby incorporated by reference.

BACKGROUND

The technology relates to a vehicle traveling control apparatus that is able to perform emergency braking control and steering control.

To reduce the burden of a driver's driving operation and to improve traveling stability, traveling control apparatuses configured to assist the driver's driving operation have been put to practical use in recent vehicles such as automobiles. For this type of traveling control apparatus, various techniques related to the following traveling control modes have been developed: a traveling control mode of performing a steering assist control and an acceleration and deceleration control assuming active driving operations performed by the driver; and a traveling control mode, i.e., an automatic driving mode, of causing the vehicle to travel without requiring the driver's driving operation. For example, reference is made to Japanese Unexamined Patent Application Publication No. 2019-172113.

The traveling control by the traveling control apparatus is implemented by, for example, an adaptive cruise control (ACC) and a lane keep control, e.g., an active lane keep centering (ALKC) control. Such traveling control makes it possible to cause the vehicle to travel automatically along a traveling lane, while keeping a distance between the vehicle and a preceding vehicle.

The traveling control apparatus uses a technique of, upon recognizing an obstacle ahead of the own vehicle by a traveling environment recognition apparatus, performing an emergency braking control, e.g., an autonomous emergency braking (AEB) control, for the obstacle to perform deceleration until a relative speed between the own vehicle and the obstacle becomes "0". The traveling environment recognition apparatus includes an autonomous sensor, such as a camera or a radar. Examples of the obstacle include a vehicle and a pedestrian.

The traveling control apparatus also uses a technique of, upon determining that contact with an obstacle is unavoidable by the emergency braking control, performing an emergency steering control, e.g., an autonomous emergency steering (AES) control, for avoidance of contact with the obstacle.

SUMMARY

An aspect of the technology provides a vehicle traveling control apparatus including an autonomous sensor, a braking controller, a determination unit, a calculator, and a steering controller. The autonomous sensor is configured to recognize an obstacle ahead of a vehicle. The braking controller is configured to determine whether the vehicle is likely to come into contact with the obstacle, on the basis of a relative distance and a relative speed between the vehicle and the obstacle. Upon determining that the vehicle is likely to come into contact with the obstacle, the braking controller is configured to and to execute a strong braking control of reducing the relative speed to "0". The determination unit is configured to calculate a predicted travel distance to be traveled until the relative speed with respect to the obstacle is reduced to "0" by the strong braking control, and to permit steering intervention for avoidance of contact with the obstacle in a case where the predicted travel distance is longer than the relative distance. During the execution of the strong braking control, the calculator is configured to calculate time-to-contact to be taken until the vehicle comes into contact with the obstacle. The steering controller is configured to execute a steering control for the avoidance of the contact with the obstacle in a case where the steering intervention is permitted and where the time-to-contact becomes equal to or less than a time threshold.

An aspect of the technology provides a vehicle traveling control apparatus including an autonomous sensor and circuitry. The autonomous sensor is configured to recognize an obstacle ahead of a vehicle. The circuitry is configured to determine whether the vehicle is likely to come into contact with the obstacle, on the basis of a relative distance and a relative speed between the vehicle and the obstacle. Upon determining that the vehicle is likely to come into contact with the obstacle, the circuitry is configured to execute a strong braking control of reducing the relative speed to "0". The circuitry is configured to calculate a predicted travel distance to be traveled until the relative speed with respect to the obstacle is reduced to "0" by the strong braking control. The circuitry is configured to permit steering intervention for avoidance of contact with the obstacle in a case where the predicted travel distance is longer than the relative distance. During the execution of the strong braking control, the circuitry is configured to calculate time-to-contact to be taken until the vehicle comes into contact with the obstacle. The circuitry is configured to execute a steering control for the avoidance of the contact with the obstacle in a case where the steering intervention is permitted and where the time-to-contact becomes equal to or less than a time threshold.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 7 is a diagram illustrating a first map for setting of a primary braking control start distance.

FIG. 10 is a diagram illustrating a first map for setting of a secondary braking control start distance.

DETAILED DESCRIPTION

Figure 1:
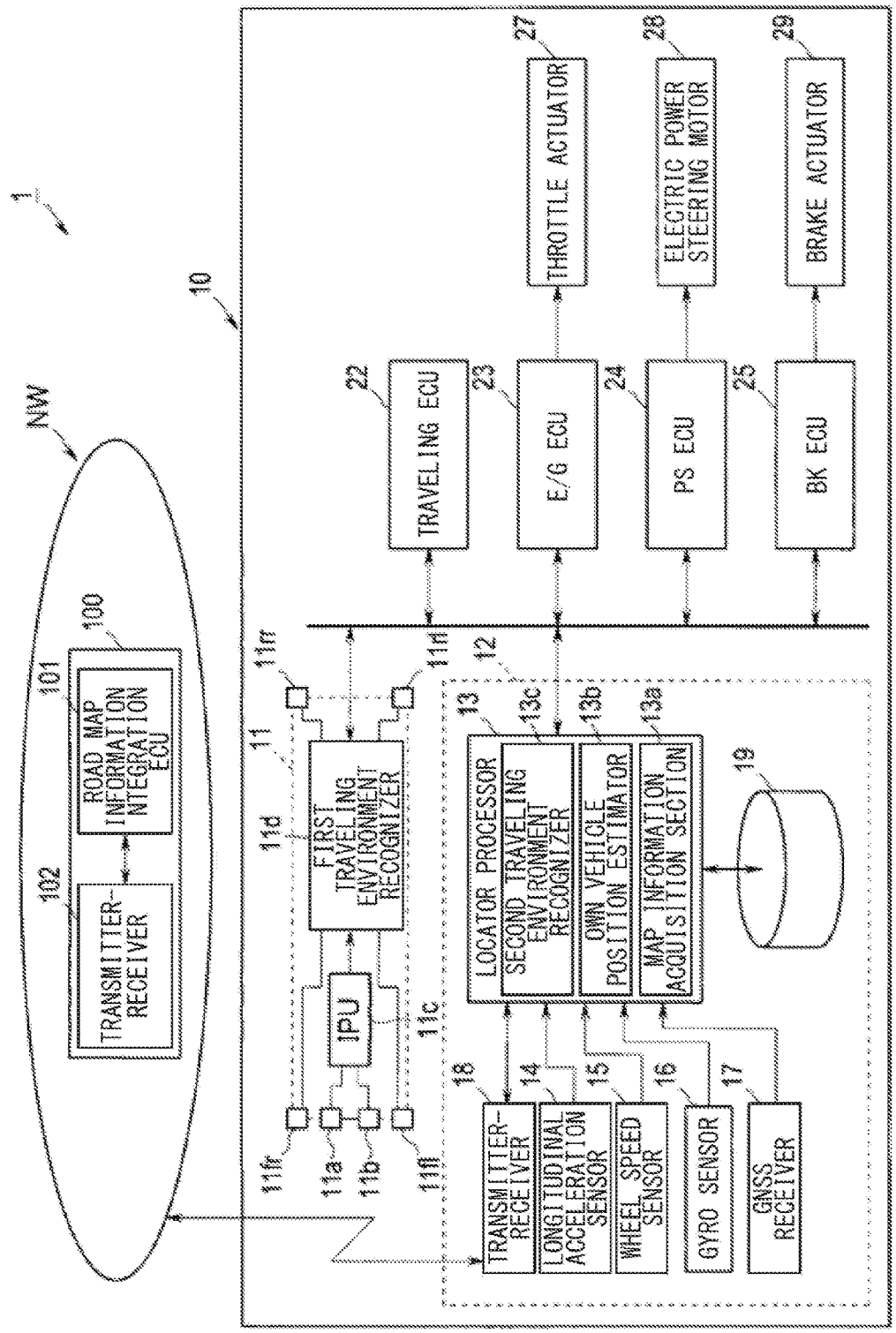
FIG. 1 is an overall configuration diagram illustrating a traveling control system.

What is desired in an emergency steering control for avoidance of contact with an obstacle is to suppress unnecessary intervention and early intervention of the control as much as possible, under an idea of giving priority to a driving operation performed by a driver.

However, in a case where the emergency steering control is caused to intervene upon determining that contact with the obstacle is unavoidable by emergency braking control as described above, the emergency steering control can intervene early even though there is room for the driver to perform steering.

It is desirable to provide a vehicle traveling control apparatus that makes it possible to cause an emergency steering control to intervene at an appropriate timing in a case where an emergency braking control is performed.

In the following, some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description.

Figure 2:
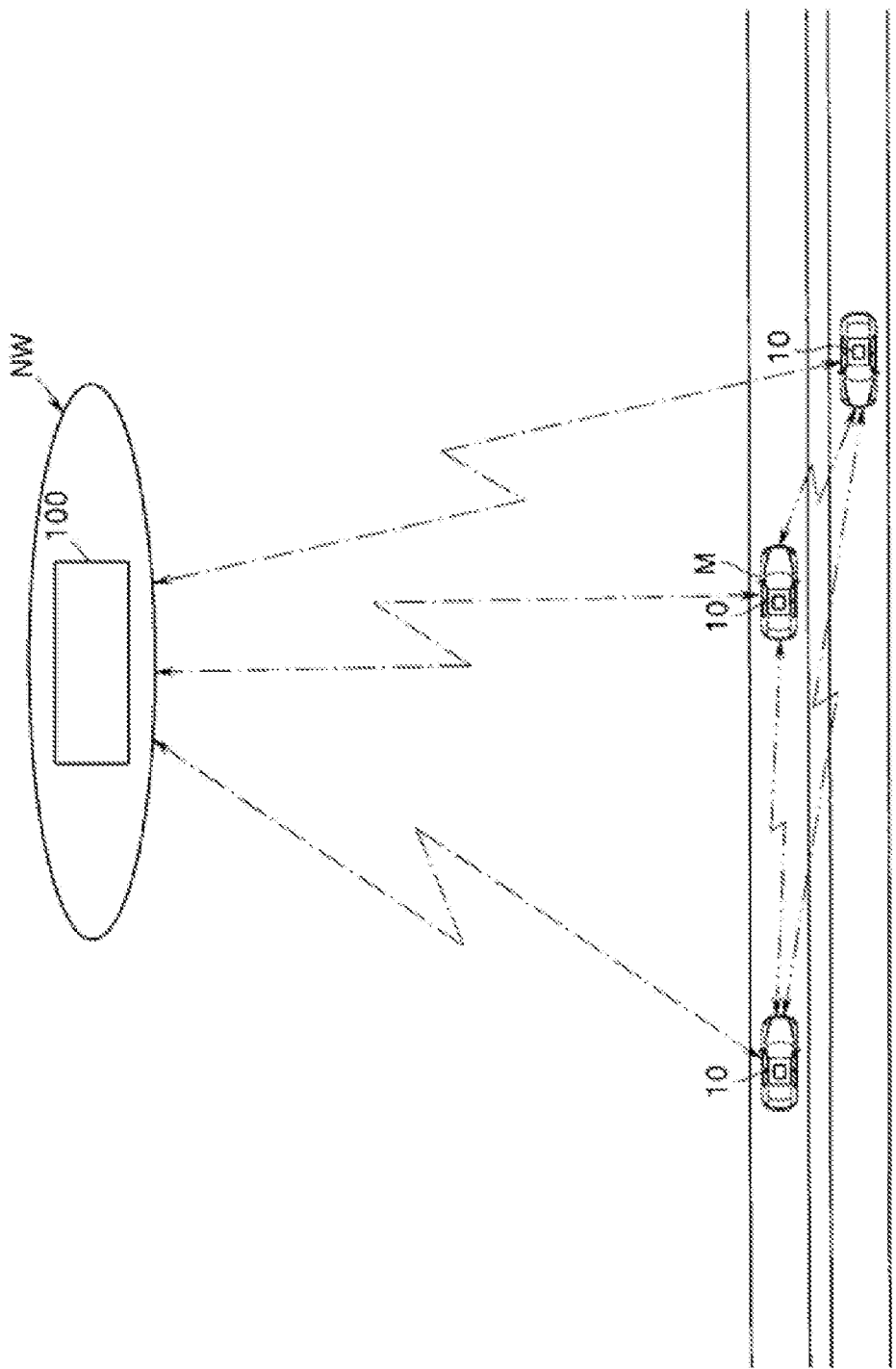
FIG. 2 is an explanatory diagram illustrating road-to-vehicle communication and vehicle-to-vehicle communication.

The drawings are related to the example embodiments of the technology. FIG. 1 is an overall configuration diagram illustrating a traveling control system according to one example embodiment. As illustrated in FIGS. 1 and 2, a traveling control system 1 according to the example embodiment may include traveling control apparatuses 10 and a traffic control apparatus 100. The traveling control apparatuses 10 may be mounted on respective ones of a plurality of vehicles. The traffic control apparatus 100 may be provided in a network environment NW to which the traveling control apparatuses 10 are coupled by wireless communication. The traffic control apparatus 100 may include, for example, a server apparatus in a network environment by cloud computing or edge computing, or a network environment by a road ancillary equipment network.

The traffic control apparatus 100 may sequentially integrate and update road map information received from the traveling control apparatuses 10 of the vehicles, and may transmit the updated road map information to the vehicles. The traffic control apparatus 100 may accordingly include a road map information integration ECU 101 and a transmitter-receiver 102.

The road map information integration ECU 101 may integrate the road map information collected from the plurality of vehicles through the transmitter-receiver 102, and may sequentially update the road map information surrounding the vehicles on roads. The road map information may include a dynamic map, for example. The road map information may include four layers of information of static information, quasi-static information, quasi-dynamic information, and dynamic information. The static information and the quasi-static information may mainly configure road information. The quasi-dynamic information and the dynamic information may mainly configure traffic information.

The static information may include, for example, information to be updated within every month, such as information on roads, structures on roads, lanes, road surfaces, and permanent regulation.

The quasi-static information may include, for example, information to be updated within every hour, such as information on traffic regulation due to road constructions and events, weather in a wide area, and predicted traffic congestion.

The quasi-dynamic information may include, for example, information to be updated within every minute, such as information on actual traffic congestion and regulation at the time of observation, temporary traffic obstruction due to fallen objects and obstacles, actual accidents, and weather in a narrow area.

The dynamic information may include, for example, information to be updated within every second, such as information transmitted and exchanged between mobile bodies, and information on the current indication of traffic lights, pedestrians and two-wheeled vehicles at an intersection, and vehicles going straight through an intersection.

Such road map information may be maintained and updated on cycles from the reception of the information to the reception of subsequent information from the vehicles. The updated road map information may be transmitted, as appropriate, to the vehicles through the transmitter-receiver 102.

The traveling control apparatus 10 may include a traveling environment recognition unit 11 and a locator unit 12, as units that recognize a traveling environment outside the vehicle (hereinafter also referred to as an own vehicle M). The traveling control apparatus 10 may also include a traveling control unit (hereinafter referred to as a "traveling ECU") 22, an engine control unit (hereinafter referred to as an "E/G ECU") 23, a power steering control unit (hereinafter referred to as a "PS ECU") 24, and a brake control unit (hereinafter referred to as a "BK ECU") 25. These control units 22 to 25, the traveling environment recognition unit 11, and the locator unit 12 may be coupled to each other via an in-vehicle communication line, such as a controller area network (CAN).

The traveling environment recognition unit 11 may be, for example, fixed at an upper-middle position of a front part in a vehicle compartment of the vehicle. The traveling environment recognition unit 11 may include an in-vehicle camera, an image processing unit (IPU) 11c, and a first traveling environment recognizer 11d. The in-vehicle camera may be a stereo camera including a main camera 11a and a subsidiary camera 11b.

The main camera 11a and the subsidiary camera 11b may be, for example, autonomous sensors that sense a real space ahead of the own vehicle M. The main camera 11a and the subsidiary camera 11b may be disposed, for example, at respective positions bilaterally symmetrical about the middle in a width direction of the own vehicle M. The main camera 11a and the subsidiary camera 11b may perform stereo imaging of a region Af (see FIG. 3) ahead of the own vehicle M from different viewpoints.

The IPU 11c may perform predetermined image processing on information of images, captured by the cameras 11a and 11b, of a traveling environment ahead of the own vehicle M, i.e., forward traveling environment image information. The IPU 11c may thus generate forward traveling environment image information that includes distance information determined on the basis of an amount of shift in position of a corresponding target in the images. In other words, the IPU 11c may generate distance image information.

The first traveling environment recognizer 11d may determine lane lines that define roads around the own vehicle M on the basis of, for example, the distance image information received from the IPU 11c.

The first traveling environment recognizer 11d may determine a road curvature [1/m] of lane lines that define right and left of a traveling course on which the own vehicle travels (i.e., an own vehicle traveling course or lane), and may determine a width (i.e., a lane width) between the right and left lane lines. The road curvature and the lane width may be determined by any of various known methods. For example, the first traveling environment recognizer 11d may determine the road curvature by recognizing right and left lane lines on the basis of the forward traveling environment image information and determining, for each predetermined section, the curvature of each of the right and left lane lines. The right and left lane lines may be recognized through a binarization process that utilizes a difference in luminance. The curvature of each of the right and left lane lines may be determined through, for example, a curve-approximating expression that is based on a least-square method.

The first traveling environment recognizer 11d may further perform predetermined pattern matching on the distance image information to recognize a three-dimensional object. Examples of the three-dimensional object may include a guard rail and a curbstone that extend along the road, and a pedestrian, a two-wheeled vehicle, and a vehicle other than a two-wheeled vehicle that are present on the road around the own vehicle M. In recognizing the three-dimensional object, the first traveling environment recognizer 11d may recognize, for example, a type of the three-dimensional object, a distance from the own vehicle M to the three-dimensional object, a speed of the three-dimensional object, and a relative speed between the three-dimensional object and the own vehicle M. Note that the three-dimensional object thus recognized on the basis of the images from the in-vehicle camera may be referred to as a camera object (camera OBJ).

To the first traveling environment recognizer 11d may be coupled, as autonomous sensors, a plurality of radar devices, e.g., a front-left side radar device 11fl, a front-right side radar device 11fr, a rear-left side radar device 11rl, and a rear-right side radar device 11rr.

The front-left side radar device 11fl and the front-right side radar device 11fr may be, for example, respectively fitted on left and right side parts of a front bumper. The front-left side radar device 11fl may monitor a region Afl obliquely left frontward and sideward of the own vehicle M (see FIG. 3). The front-right side radar device 11fr may monitor a region Afr obliquely right frontward and sideward of the own vehicle M (see FIG. 3). The regions Afl and Afr are difficult to monitor in the images from the cameras 11a and 11b described above. The front-left side radar device 11fl and the front-right side radar device 11fr may be disposed to make the regions Afl and Afr partly overlap with the region Af covered by the cameras 11a and 11b.

The rear-left side radar device 11rl and the rear-right side radar device 11rr may be, for example, respectively fitted on left and right side parts of a rear bumper. The rear-left side radar device 11rl may monitor a region Arl leftward and rearward of the own vehicle M (see FIG. 3). The rear-right side radar device 11rr may monitor a region Arr rightward and rearward of the own vehicle M (see FIG. 3). The regions Arl and Arr are difficult for the front-left side radar device 11fl and the front-right side radar device 11fr described above to monitor. The rear-left side radar device 11rl and the rear-right side radar device 11rr may be disposed to make the regions Arl and Arr partly overlap with each other and respectively overlap with the regions Afl and Afr.

The radar devices 11fl, 11fr, 11rl, and 11rr may each include, for example, a millimeter-wave radar, a laser radar, or a light detection and ranging (LIDER). Each of the radar devices 11fl, 11fr, 11rl, and 11rr may, every preset frame period, emit a radar wave in a horizontal direction and receive a reflected wave of the emitted radar wave. Examples of the radar wave may include a radio wave and a laser beam. Each of the radar devices 11fl, 11fr, 11rl, and 11rr may thus detect a plurality of reflection points on a three-dimensional object present around the own vehicle M. Each of the radar devices 11fl, 11fr, 11rl, and 11rr may analyze positions and movement speeds, for example, of the detected reflection points and perform grouping to thereby recognize the three-dimensional object. The positions to be analyzed may be relative positions with respect to the own vehicle M.

Each of the radar devices 11fl, 11fr, 11rl, and 11rr may set the reflection point closest to the own vehicle M in direct distance, out of the reflection points on the recognized three-dimensional object, as a representative point of the three-dimensional object. Each of the radar devices 11fl, 11fr, 11rl, and 11rr may recognize, as information related to the representative point, a position and a relative speed Vr of the reflection point corresponding to the representative point, for example. Each of the radar devices 11fl, 11fr, 11rl, and 11rr may also recognize the size of the three-dimensional object calculated on the basis of distribution of the reflection points. Note that the three-dimensional object thus recognized by each of the radar devices 11fl, 11fr, 11rl, and 11rr may be referred to as a radar object (radar OBJ).

The information related to the radar OBJ thus recognized by each of the radar devices 11fl, 11fr, 11rl, and 11rr may be inputted to the first traveling environment recognizer 11d. This enables the first traveling environment recognizer 11d to recognize, as three-dimensional objects, various mobile bodies as well as a preceding vehicle present ahead of the own vehicle M, for example. Examples of the various mobile bodies may include a side-by-side vehicle present side-by-side with the own vehicle M, a crossing vehicle approaching the own vehicle M from a direction crossing the own vehicle traveling course at an intersection, for example, and a subsequent vehicle present behind the own vehicle M.

Figure 3:
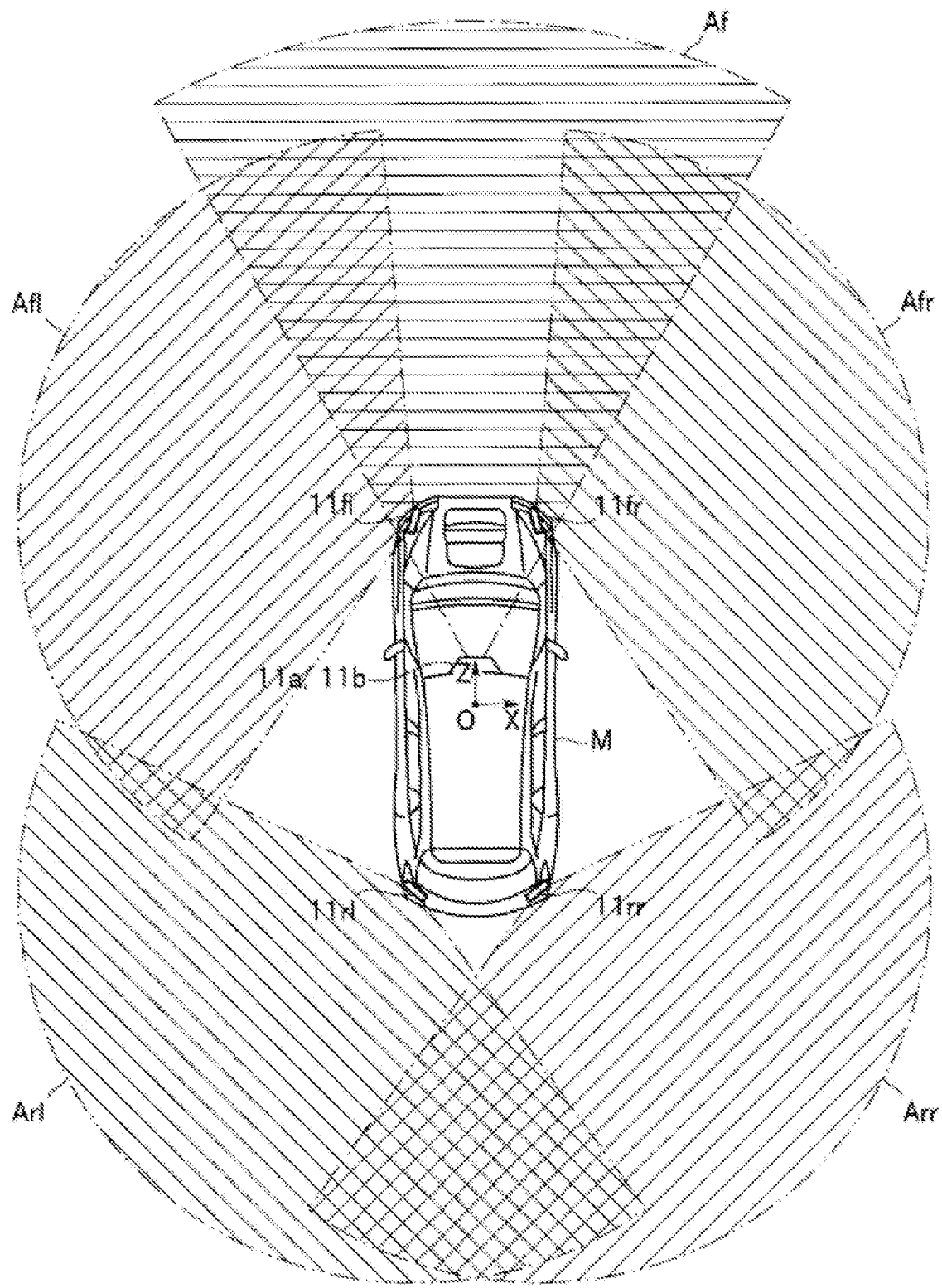
FIG. 3 is an explanatory diagram illustrating regions monitored by a stereo camera and radar devices.

The first traveling environment recognizer 11d may convert positions of the recognized camera OBJ and radar OBJ into, for example, coordinates of a rectangular coordinate system whose origin O is the center of the own vehicle M. The rectangular coordinate system may be a coordinate system whose Z-axis is a longitudinal direction of the own vehicle M and X-axis is the width direction of the own vehicle M, as illustrated in FIG. 3. The first traveling environment recognizer 11d may further make comparison between the camera OBJ and the radar OBJ, and may recognize, as a fusion object (fusion OBJ), a combination of the camera OBJ and the radar OBJ that match each other on the basis of a preset condition.

The locator unit 12 may estimate a position of the own vehicle (i.e., an own vehicle position) on a road map. The locator unit 12 may include a locator processor 13 that estimates the own vehicle position. The locator processor 13 may have an input terminal coupled to sensors to be used to estimate the position of the own vehicle M, i.e., the own vehicle position. Examples of the sensors may include a longitudinal acceleration sensor 14, a wheel speed sensor 15, a gyro sensor 16, and a GNSS receiver 17. The longitudinal acceleration sensor 14 may detect a longitudinal acceleration rate of the own vehicle M. The wheel speed sensor 15 may detect a speed of rotation, i.e., a wheel speed, of each of a front-right wheel, a front-left wheel, a rear-right wheel, and a rear-left wheel. The gyro sensor 16 may detect an angular velocity or angular acceleration of the own vehicle M. The GNSS receiver 17 may receive positioning signals from a plurality of positioning satellites. The locator processor 13 may also be coupled to a transmitter-receiver 18. The transmitter-receiver 18 may be configured to transmit and receive information to and from the traffic control apparatus 100, i.e., to perform road-to-vehicle communication as indicated by dashed and single-dotted lines in FIG. 2. The transmitter-receiver 18 may also be configured to transmit and receive information to and from other vehicles, i.e., to perform vehicle-to-vehicle communication as indicated by dashed and double-dotted lines in FIG. 2.

The locator processor 13 may also be coupled to a high-precision road map database 19. The high-precision road map database 19 may be a large-capacity storage medium such as a hard disk drive (HDD). The high-precision road map database 19 may have high-precision road map information, e.g., a dynamic map, stored therein. The high-precision road map information may include, as information to be used in performing a traveling control of the own vehicle M, information similar to the road map information that is sequentially updated by the road map information integration ECU 101 described above, for example. In other words, the high-precision road map information may include four layers of information of static information, quasi-static information, quasi-dynamic information, and dynamic information. The static information and the quasi-static information may mainly configure road information. The quasi-dynamic information and the dynamic information may mainly configure traffic information.

The locator processor 13 may include a map information acquisition section 13a, an own vehicle position estimator 13b, and a second traveling environment recognizer 13c.

The map information acquisition section 13a may acquire route map information on a route from a current location to a destination from the map information stored in the high-precision road map database 19. The map information acquisition section 13a may acquire the route map information on the basis of, for example, the destination set by a driver for automatic driving.

The map information acquisition section 13a may transmit the acquired route map information (i.e., lane data on a route map) to the own vehicle position estimator 13b. The own vehicle position estimator 13b may acquire positional coordinates of the own vehicle M on the basis of the positioning signals received by the GNSS receiver 17. The own vehicle position estimator 13b may perform map-matching of the acquired positional coordinates on the route map information to thereby estimate the own vehicle position on the road map and recognize right and left lane lines that define the own vehicle traveling course or lane. The own vehicle position estimator 13b may also acquire a road curvature of the middle of the traveling lane included in the road map information.

While the own vehicle is traveling in an environment, such as a region in a tunnel, where it is difficult to receive effective signals from the positioning satellites due to decreased sensitivity of the GNSS receiver 17, the own vehicle position estimator 13b may switch the satellite navigation to autonomous navigation in order to estimate the position of the own vehicle on the road map. In the autonomous navigation, the own vehicle position may be estimated on the basis of a vehicle speed determined on the basis of the wheel speed detected by the wheel speed sensor 15, the angular velocity detected by the gyro sensor 16, and the longitudinal acceleration rate detected by the longitudinal acceleration sensor 14.

Upon estimating the own vehicle position on the road map on the basis of the positioning signals received by the GNSS receiver 17 or the information detected by the gyro sensor 16, for example, as described above, the own vehicle position estimator 13b may determine information such as a road type of the traveling course on which the own vehicle M is traveling, on the basis of the estimated own vehicle position on the road map.

The second traveling environment recognizer 13c may update the road map information stored in the high-precision road map database 19 to the latest state, by using the road map information acquired by external communication through the transmitter-receiver 18. Examples of the external communication may include road-to-vehicle communication and vehicle-to-vehicle communication. This information update may be performed for not only the static information, but also the quasi-static information, the quasi-dynamic information, and the dynamic information. The road map information may thus include the road information and the traffic information acquired by communication with the outside of the vehicle, and information on a mobile body such as a vehicle traveling on a road may be updated substantially in real time.

The second traveling environment recognizer 13c may also verify the road map information on the basis of the traveling environment information recognized by the traveling environment recognition unit 11, and may update the road map information stored in the high-precision road map database 19 to the latest state. This information update may be performed for not only the static information, but also the quasi-static information, the quasi-dynamic information, and the dynamic information. Thus, information, recognized by the traveling environment recognition unit 11, on a mobile body such as a vehicle traveling on a road may be updated in real time.

The road map information thus updated may be transmitted to the traffic control apparatus 100 and vehicles surrounding the own vehicle M, for example, by road-to-vehicle communication and vehicle-to-vehicle communication through the transmitter-receiver 18.

The second traveling environment recognizer 13c may recognize road map information of a set range, of the updated road map information, as second traveling environment information. The set range may be a range around the own vehicle position estimated by the own vehicle position estimator 13b. The range of the second traveling environment information recognized by the second traveling environment recognizer 13c may be wider than that of first traveling environment information recognized by the first traveling environment recognizer 11d. For example, road map information of a range within 1-km radius of the own vehicle position may be recognized as the second traveling environment information.

The traveling ECU 22 may read, for example, the first traveling environment information recognized by the first traveling environment recognizer 11d of the traveling environment recognition unit 11, and the second traveling environment information recognized by the second traveling environment recognizer 13c of the locator unit 12. The traveling ECU 22 may have an input terminal coupled to various switches and sensors. None of the switches and sensors are illustrated. Examples of the switches and sensors may include a mode switch, a steering torque sensor, a brake sensor, an accelerator sensor, and a yaw rate sensor. The mode switch may allow the driver to perform, for example, on/off switching of the automatic driving (i.e., traveling control). The steering torque sensor may detect steering torque as an amount of driving operation performed by the driver. The brake sensor may detect a depression amount of a brake pedal as an amount of driving operation performed by the driver. The accelerator sensor may detect a depression amount of an accelerator pedal as an amount of driving operation performed by the driver. The yaw rate sensor may detect a yaw rate that acts on the own vehicle M.

The traveling ECU 22 may have, as driving modes, a manual driving mode, a first traveling control mode and a second traveling control mode serving as modes for the traveling control, and a refuge mode. The traveling ECU 22 may be able to selectively switch between these driving modes on the basis of, for example, how the mode switch is operated.

The manual driving mode may be a driving mode in which the driver has to hold a steering wheel. For example, the manual driving mode may be a driving mode of causing the own vehicle M to travel in accordance with a driving operation performed by the driver, including a steering operation, an accelerator operation, and a brake operation.

The first traveling control mode may also be a driving mode in which the driver has to hold the steering wheel. For example, the first traveling control mode may be a semi-automatic driving mode of causing the own vehicle M to travel along a target route, while reflecting a driving operation performed by the driver. This mode may be achieved by mainly performing an adaptive cruise control (ACC) in combination with any other control as appropriate, by controlling the E/G ECU 23, the PS ECU 24, and the BK ECU 25. Examples of any other control may include a lane keep control, e.g., an active lane keep centering (ALKC) control, and a lane departure prevention control, e.g., active lane keep bouncing control.

The second traveling control mode may be an automatic driving mode of causing the own vehicle M to travel along a target route (i.e., the route map information), without requiring the driver to hold the steering wheel or perform an accelerator operation or a brake operation. This mode may be achieved by mainly performing, as appropriate, an adaptive cruise control in combination with any other control, such as a lane keep control and a lane departure prevention control, by controlling the E/G ECU 23, the PS ECU 24, and the BK ECU 25.

The refuge mode may automatically stop the own vehicle M to a side strip, for example, in a case where traveling based on the second traveling control mode becomes unable to continue during the traveling in the second traveling control mode, and where the driver fails to take over the driving operation, e.g., where there is a failure in shifting to the manual driving mode or to the first traveling control mode.

In the driving modes described above, the traveling ECU 22 performs an emergency braking control, e.g., an autonomous emergency braking (AEB) control, as appropriate, for an obstacle such as a vehicle that is likely to come into contact with the own vehicle M. This emergency braking control may be, for example, an interrupt control performed on the basis of the first traveling environment information.

The emergency braking control may be performed on the basis of, for example, the camera OBJ recognized by the stereo camera. For example, the emergency braking control may be performed in two phases of primary braking control and secondary braking control.

The primary braking control may be an alert braking control of prompting the driver to perform an operation of avoiding contact with the obstacle. The primary braking control may be a gentle braking control of decelerating the own vehicle M by using a relatively low deceleration rate a0.

The secondary braking control may be a main braking control performed in a case where the driver does not perform an appropriate contact avoidance operation in response to the primary braking control. The secondary braking control may be a strong braking control of decelerating the own vehicle M until a relative speed with respect to the obstacle becomes "0" by using a deceleration rate ap higher than in the primary braking control.

These braking controls may each be executed in a case where the relationship between a relative speed Vrel and a relative distance dcam between the own vehicle M and the obstacle becomes equal to or less than a threshold.

In the example embodiment, for example, the traveling ECU 22 may calculate braking control start distances D1 and D2 serving as distance thresholds, on the basis of the relationship between the relative speed Vrel and an overlap ratio R (see FIG. 6) between the own vehicle M and the obstacle. To calculate these distance thresholds, the traveling ECU 22 may have a map for setting of a primary braking control start distance and a map for setting of a secondary braking control start distance stored therein. The maps may be preset on the basis of an experiment or a simulation, for example. These maps may be set as follows, for example: as the relative speed Vrel becomes lower, the distance threshold is set to a smaller value to delay a deceleration start timing; and, as the overlap ratio R becomes lower, the distance threshold is set to a smaller value to delay the deceleration start timing. In other words, the maps may be set to leave, as the relative speed Vrel becomes lower and the overlap ratio R becomes lower, more room for the driver to avoid contact with the obstacle by his/her own driving operation.

Note that time-to-contact (TTC) calculated by dividing the relative distance dcam by the relative speed Vrel may be a parameter having substantially the same meaning as the relative distance dcam in the braking control. Therefore, it is also possible to use the TTC as a parameter indicating the relationship between the relative speed Vrel and the relative distance dcam, and to set a map for calculation of a time threshold Tth for the TTC on the basis of the relative speed Vrel and the relative distance dcam.

As the map for the setting of the primary braking control start distance, first to third maps to be used to calculate the distance threshold that differs depending on a traveling scene, for example, may be stored in the traveling ECU 22. The distance threshold may be the primary braking control start distance D1.

Figure 7:
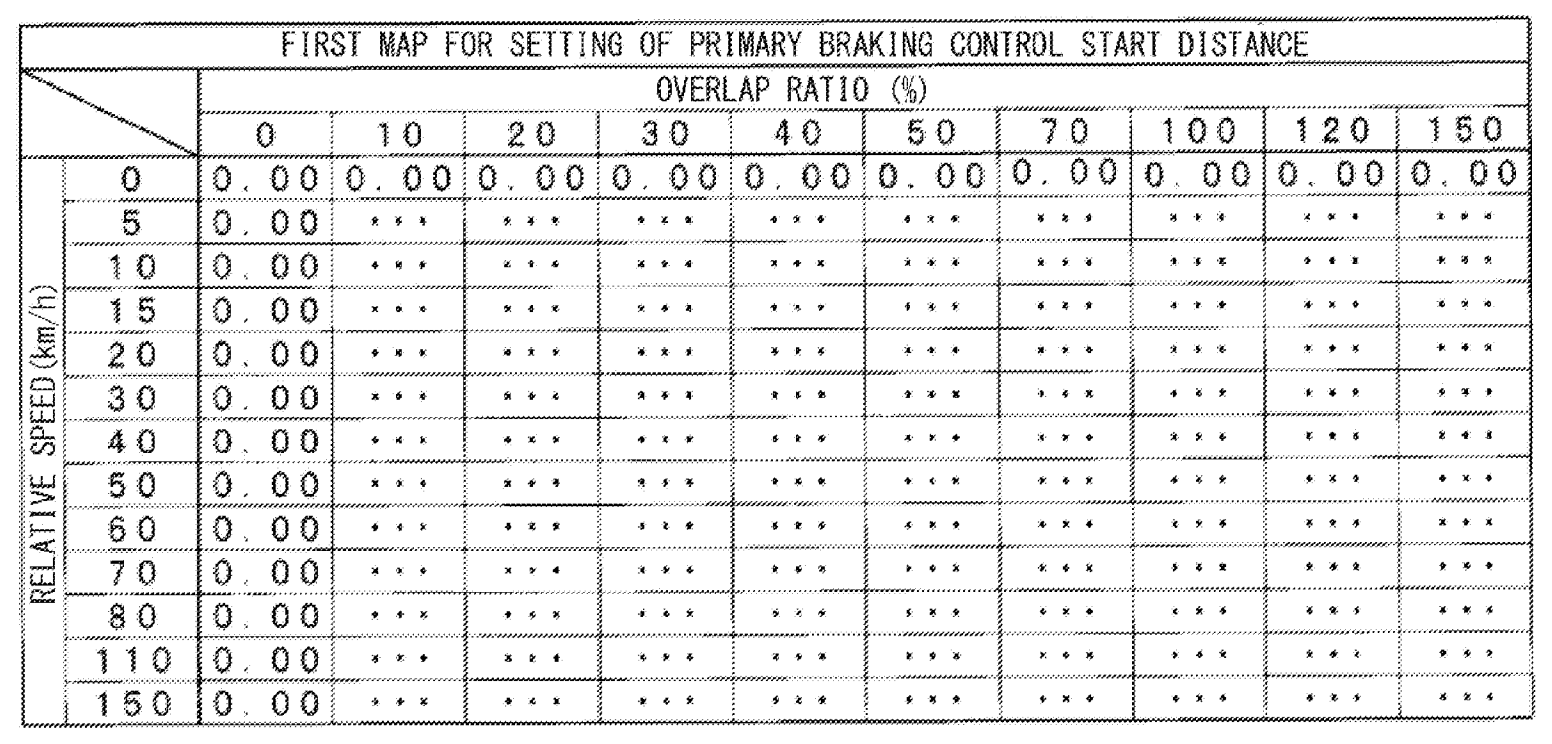

The first map for the setting of the primary braking control start distance may be a basic map for setting of an intervention timing of the primary braking control (see FIG. 7).

Figure 8:
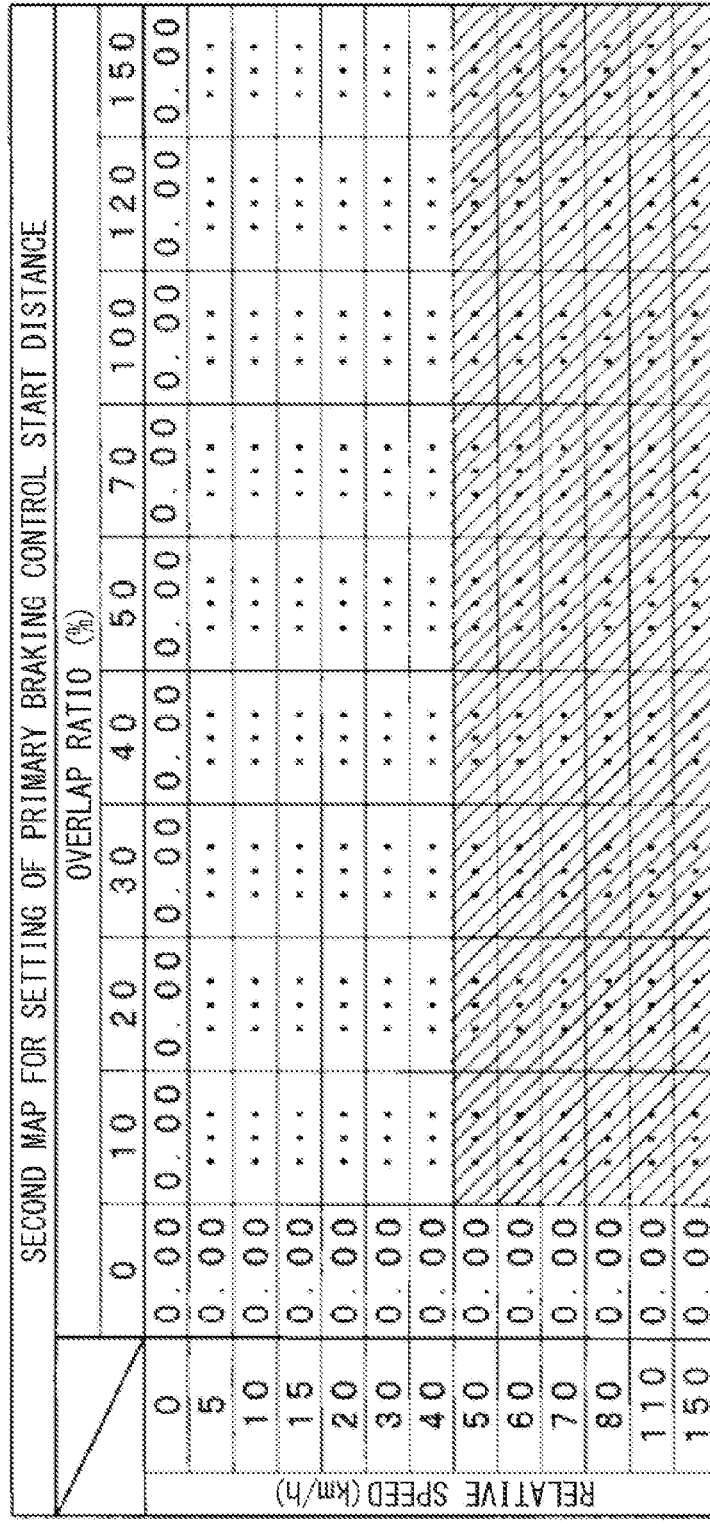
FIG. 8 is a diagram illustrating a second map for the setting of the primary braking control start distance.

The second map for the setting of the primary braking control start distance may be, for example, a map set to make the intervention timing of the primary braking control in a high-speed range earlier than that in the first map (see FIG. 8).

Figure 9:
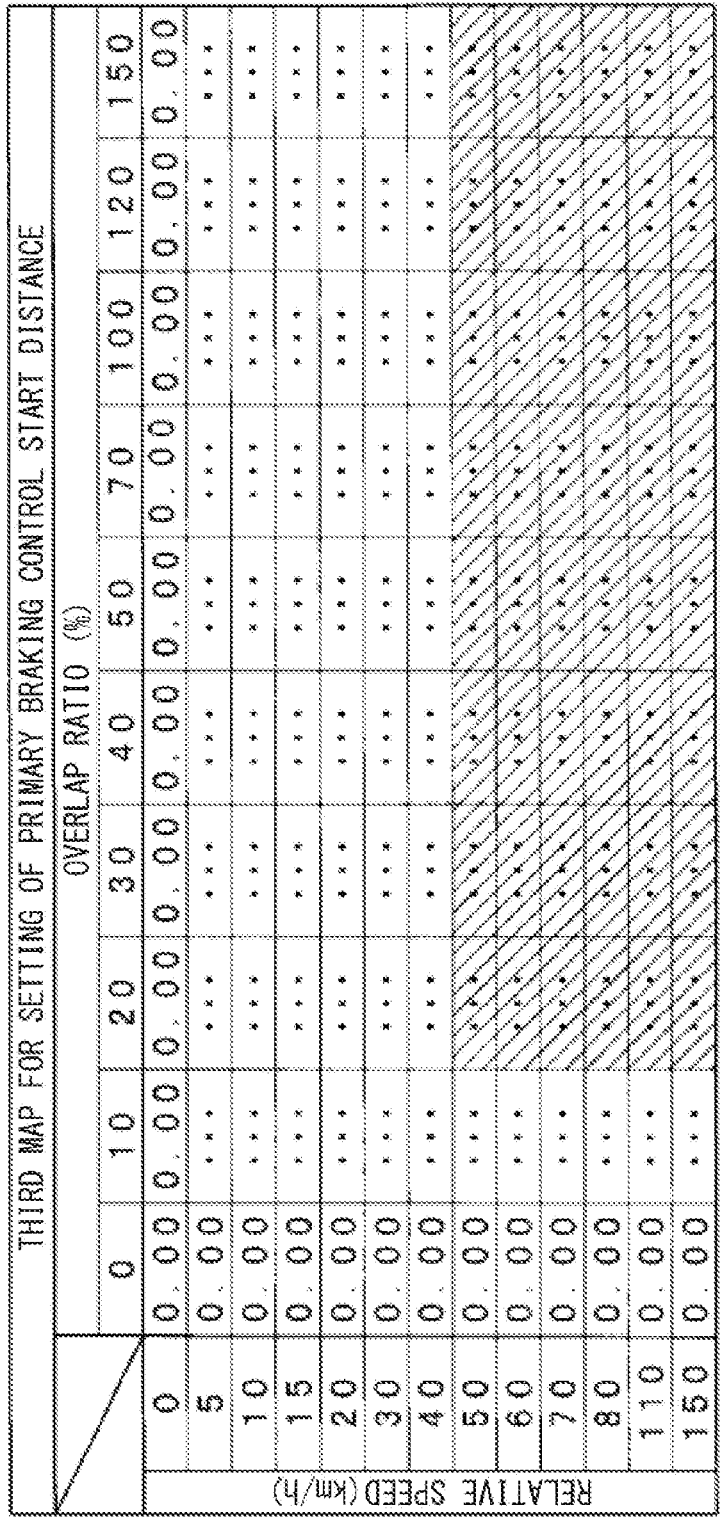
FIG. 9 is a diagram illustrating a third map for the setting of the primary braking control start distance.

The third map for the setting of the primary braking control start distance may be, for example, a map set to make the intervention timing of the primary braking control in the high-speed range roughly earlier than that in the second map (see FIG. 9).

As the map for the setting of the secondary braking control start distance, first and second maps to be used to calculate the distance threshold that differs depending on a traveling scene, for example, may be stored in the traveling ECU 22. The distance threshold may be the secondary braking control start distance D2.

The first map for the setting of the secondary braking control start distance may be a basic map for setting of an intervention timing of the secondary braking control (see FIG. 10). The first map for the setting of the secondary braking control start distance may be, for example, selected in all scenes other than a traveling scene where the second map to be described later is selected (see FIG. 12).

Figure 11:
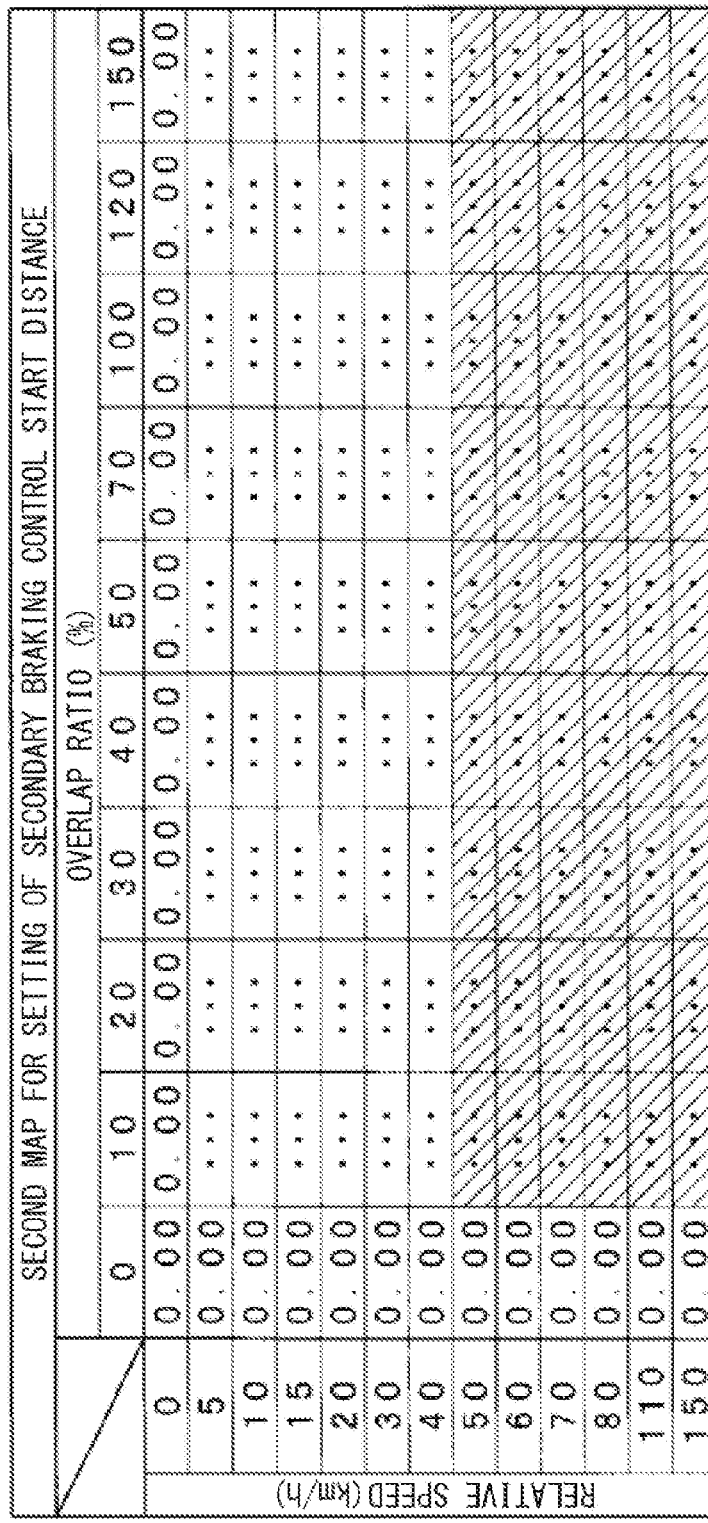
FIG. 11 is a diagram illustrating a second map for the setting of the secondary braking control start distance.

The second map for the setting of the secondary braking control start distance may be, for example, a map set to make the intervention timing of the secondary braking control in the high-speed range earlier than that in the first map (see FIG. 11). The second map for the setting of the secondary braking control start distance may be selected, for example, in a case where the obstacle is a vehicle and where the own vehicle M is traveling on a main line of an expressway. In one example, the second map for the setting of the secondary braking control start distance may be selected in a case where the obstacle is a vehicle, where the own vehicle M is traveling on a main line of an expressway, and where a road shape, for example, of the own vehicle traveling course recognized by the stereo camera has reliability equal to or greater than preset reliability with respect to the road map information (see FIG. 12).

The traveling ECU 22 may selectively use these maps to set the primary braking control start distance D1 and the secondary braking control start distance D2 with complementary calculation. In a case where the relative distance dcam becomes equal to or less than the primary braking control start distance D1, the traveling ECU 22 may perform the primary braking control using the preset deceleration rate a0. In a case where the relative distance dcam becomes equal to or less than the secondary braking control start distance D2 during the primary braking control, the traveling ECU 22 may perform the secondary braking control using the preset deceleration rate ap.

In addition, upon determining that contact with the obstacle is unavoidable even by performing the secondary braking control, the traveling ECU 22 performs an emergency steering control, e.g., an autonomous emergency steering (AES) control, for avoidance of contact with the obstacle. This emergency steering control may be, for example, interrupt control performed on the basis of the first traveling environment information, and may be performed as appropriate in parallel with the secondary braking control in the example embodiment.

The emergency steering control may be performed on the basis of, for example, the camera OBJ recognized by the stereo camera.

In the emergency steering control, the traveling ECU 22 calculates a travel distance to be traveled after the secondary braking control is started until the relative speed Vrel becomes "0". This travel distance is also referred to as a predicted travel distance Dp. In a case where the predicted travel distance Dp is equal to or greater than the relative distance dcam, the traveling ECU 22 determines that contact with the obstacle is unavoidable by the secondary braking control, and permits intervention of the emergency steering control.

This calculation of the predicted travel distance Dp may factor in, for example, a travel distance during control delay time of the traveling control apparatus 10, a travel distance when the deceleration rate is increasing, a travel distance after the deceleration rate is stabilized, and a margin.

Figures 12, 13:
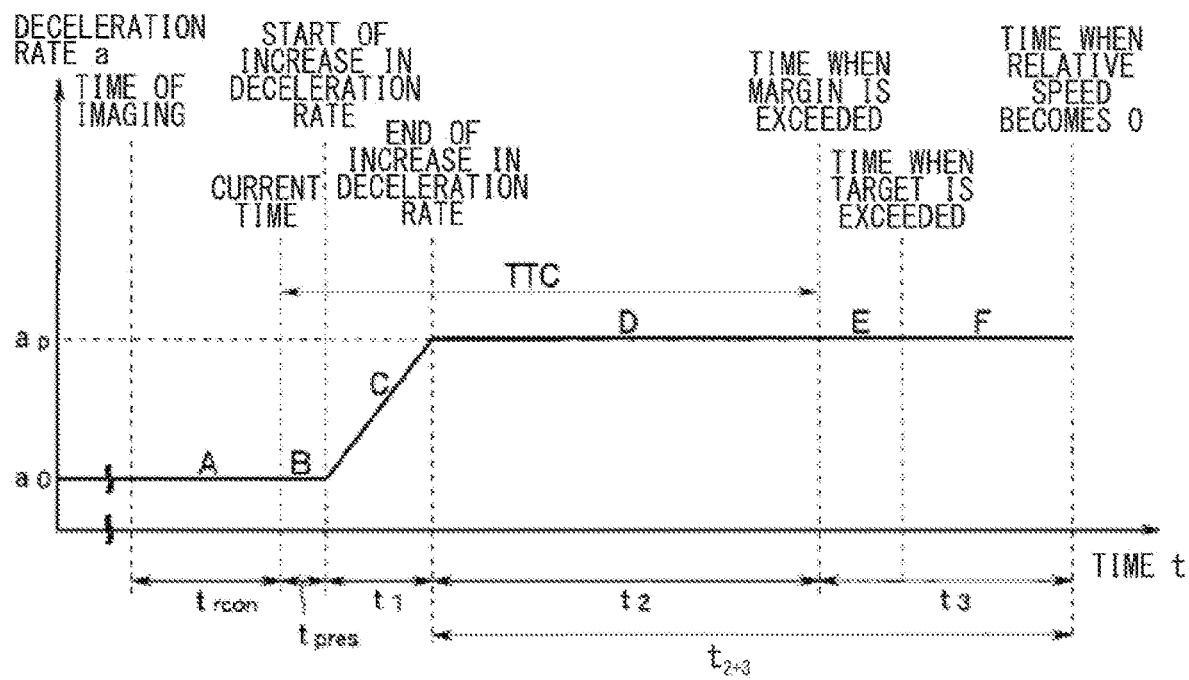
FIG. 12 is an explanatory diagram illustrating a condition for selection of the map for the setting of the secondary braking control start distance.
FIG. 13 is an explanatory diagram illustrating time-to-contact during a secondary braking control.

For example, in the calculation of the predicted travel distance Dp, the traveling ECU 22 may calculate a distance that is traveled by the own vehicle M during the control delay time, i.e., control delay time travel distance $d_{delay}$, as illustrated in FIG. 13. Examples of the control delay time may include recognition delay time to the current time from when the obstacle is imaged by the traveling environment recognition unit 11, and brake pressure increase delay time in a brake actuator 29 to be described later. The traveling ECU 22 may calculate the control delay time travel distance $d_{delay}$ on the basis of, for example, the following expression (1).

$$d_{delay} = v_0 \cdot (t_{rocn} + t_{pres}) + d_v \qquad (1)$$

In the expression (1), $t_{rocn}$ may denote the recognition delay time, and $t_{pres}$ may denote the brake pressure increase delay time (see A and B in FIG. 13), both being constants unique to the own vehicle M. In addition, $v_0$ may denote the current relative speed Vrel. In addition, $d_v$ may denote a correction term, based on a change in relative speed, for the recognition delay time, and may be expressed by $$d_v = (1/2) \cdot a_p \cdot t_{rcon}^2,$$

where $a_p$ denotes a predicted stable deceleration rate, i.e., a target deceleration rate of the secondary braking control.

In the calculation of the predicted travel distance Dp, the traveling ECU 22 may calculate a travel distance $d_1$ traveled until the deceleration rate increases to the target deceleration rate $a_p$, i.e., when the deceleration rate is increasing. The traveling ECU 22 may calculate the travel distance $d_1$ on the basis of, for example, the following expression (2).

$$d_1 = (1/6) \cdot j \cdot t_1^3 - (1/2) \cdot a_p \cdot t_1^2 - v_p \cdot t_1 \qquad (2)$$

In the expression (2), j may denote the maximum jerk of the deceleration rate, $a_p$ may denote the target deceleration rate, and $a_0$ may denote the current deceleration rate a. In addition, $t_1$ may denote time that is taken for the deceleration rate to increase (see C in FIG. 13), and may be expressed by $$t_1 = (a_p - a_0)/j.$$

In the expression (2), $v_p$ may denote a predicted relative speed at the end of the deceleration rate increase, and may be expressed by $$v_p = (1/2) \cdot j \cdot t_1^2 - a p \cdot t_1 + v_0.$$

In the calculation of the predicted travel distance Dp, the traveling ECU 22 may calculate a travel distance $d_{2+3}$ after the deceleration rate is stabilized on the basis of the following expression (3).

$$d_{2+3} = (1/2) \cdot a_p \cdot t_{2+3}^2 - v_p \cdot t_{2+3} \tag{3}$$

In the expression (3), $t_{2+3}$ may denote travel time in a stable deceleration rate section, taken until the relative speed becomes "0" (see D, E, and F in FIG. 13), and may be expressed by $$t_{2+3} = v_p / a_p.$$

The traveling ECU 22 may calculate the predicted travel distance Dp to be traveled until the relative speed Vrel is reduced to "0" by the secondary braking control on the basis of, for example, the following expression (4).

$$Dp = d_{delay} + d_1 + d_{2+3} + d_{margin} \tag{4},$$

where $d_{margin}$ denotes a preset margin distance.

In addition, the traveling ECU 22 calculates the TTC from the current time to a time when the own vehicle M comes into contact with the obstacle. In a case where the TTC becomes equal to or less than the time threshold Tth, the traveling ECU 22 executes the emergency steering control for avoidance of contact with the obstacle.

For example, the traveling ECU 22 may calculate the TTC by factoring in the brake pressure increase delay time $t_{pres}$ in the traveling control apparatus 10, the travel time $t_1$ in the deceleration rate increasing section, and the travel time $t_2$ after the deceleration rate is stabilized.

In other words, the traveling ECU 22 may calculate, as the TTC, travel time from the current time to a time when a distance between the own vehicle M and the obstacle, i.e., a target, becomes "0" by using the following expression (5), for example.

$$TTC = t_{pres} + t_1 + t_2 \tag{5},$$

where $t_2$ denotes travel time from when the deceleration rate shifts to the stable section to a time when the margin is exceeded, and may be calculated by $t_2 = t_{2+3} - t_3$.

In the expression, $t_3$ may be calculated by $t_3 = (2(Dp - dcam)/-ap)^{1/2}$.

Using the predicted travel distance Dp described above for the calculation of $t_3$ allows the recognition delay time attributed to the autonomous sensors to be factored in the calculation of the TTC as well.

Note that, in the calculation of the travel time $t_{2+3}$ in the stable deceleration rate section, in a case where the deceleration rate falls within the stable section, the actual deceleration rate a and the current relative speed Vrel may be used as the deceleration rate $a_p$ and the relative speed $v_p$.

In addition, the traveling ECU 22 may set the time threshold Tth with complementary calculation by, for example, using a preset map. The preset map may be a map for setting of a time threshold for steering intervention start.

Figure 14:
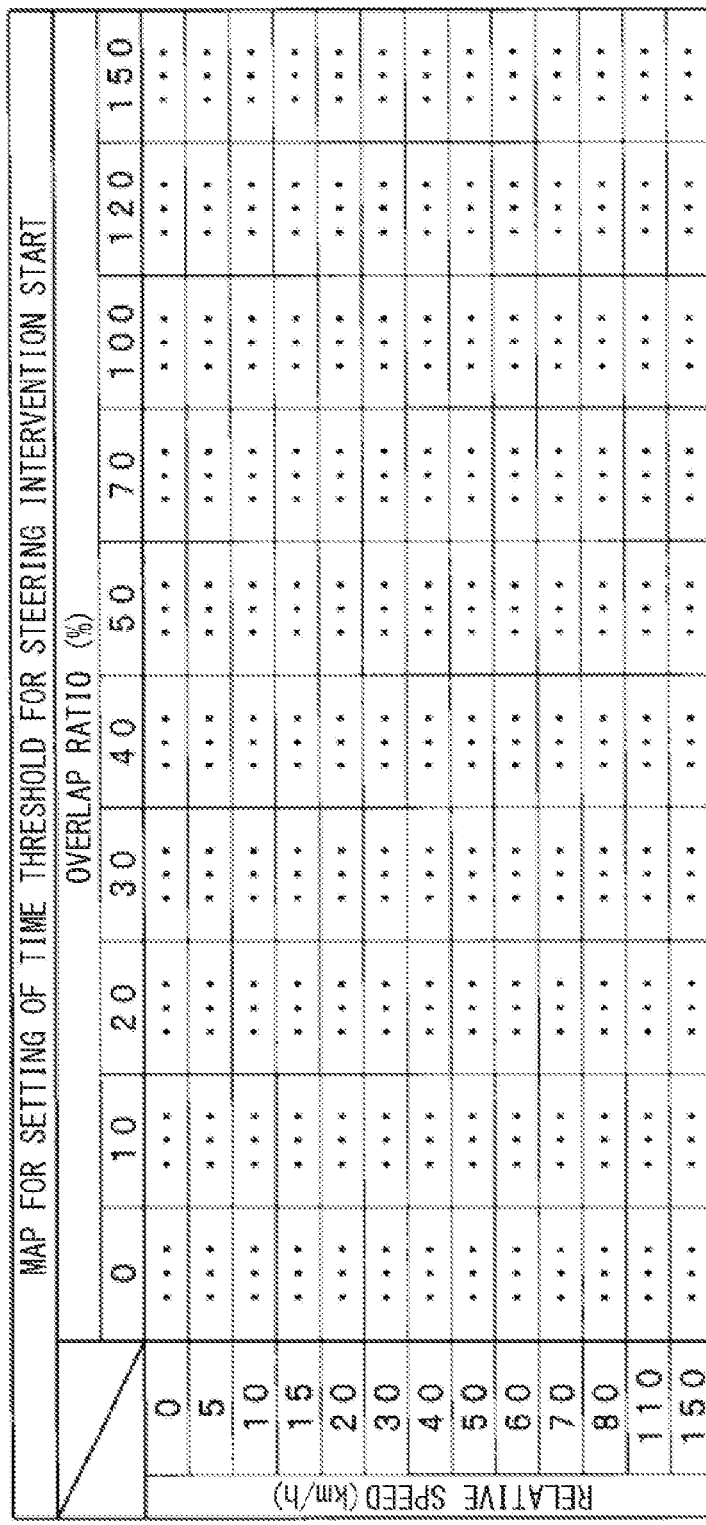
FIG. 14 is a diagram illustrating a map for setting of a time threshold for steering intervention start.

The map for the setting of the time threshold for the steering intervention start may be set on the basis of an experiment or a simulation. For example, as illustrated in FIG. 14, the map for the setting of the time threshold for the steering intervention start may be set as follows: as the relative speed Vrel becomes lower, the time threshold is set to a smaller value to delay a steering start timing; and, as the overlap ratio R becomes lower, the time threshold is set to a smaller value to delay the steering start timing.

In a case where the TTC is equal to or less than the time threshold Tth, the traveling ECU 22 may set a target lateral position. For example, the target lateral position may be set by adding a predetermined margin to a lateral position at which the overlap ratio R between the own vehicle M and the obstacle becomes "0". The traveling ECU 22 may generate a target path by using, in place of the actual vehicle speed, an estimated vehicle speed calculated on the basis of a model of the secondary braking control, and may perform steering-increase control and steering-decrease control with respect to the target lateral position. Thus using the estimated vehicle speed in place of the actual vehicle speed corrects discrepancy between the target path and the actual behavior during the emergency steering control.

As described above, in one embodiment, the traveling ECU 22 may serve as a "braking controller", a "determination unit", a "calculator", and a "steering controller".

The E/G ECU 23 may have an output terminal coupled to a throttle actuator 27. The throttle actuator 27 may open and close a throttle valve of an electronic control throttle device disposed on a throttle body of an engine. The throttle valve may be opened or closed in response to a driving signal from the E/G ECU 23 to regulate an intake air flow. This helps to generate an engine output at a desired level.

The PS ECU 24 may have an output terminal coupled to an electric power steering motor 28. The electric power steering motor 28 may impart a steering torque to a steering mechanism using a rotary power of the motor. For the automatic driving, the electric power steering motor 28 may be driven in response to a driving signal from the PS ECU 24 to execute the lane keep control that causes the own vehicle M to keep traveling in the same lane and a lane change control that causes the own vehicle M to move to an adjacent lane for passing, for example.

The BK ECU 25 may have an output terminal coupled to the brake actuator 29. The brake actuator 29 may regulate a brake hydraulic pressure to be applied to a brake wheel cylinder of each of the wheels. When the brake actuator 29 is driven in response to a driving signal from the BK ECU 25, the brake wheel cylinder of each of the wheels may generate a brake force, which forcibly decelerates the own vehicle M.

Figure 4:
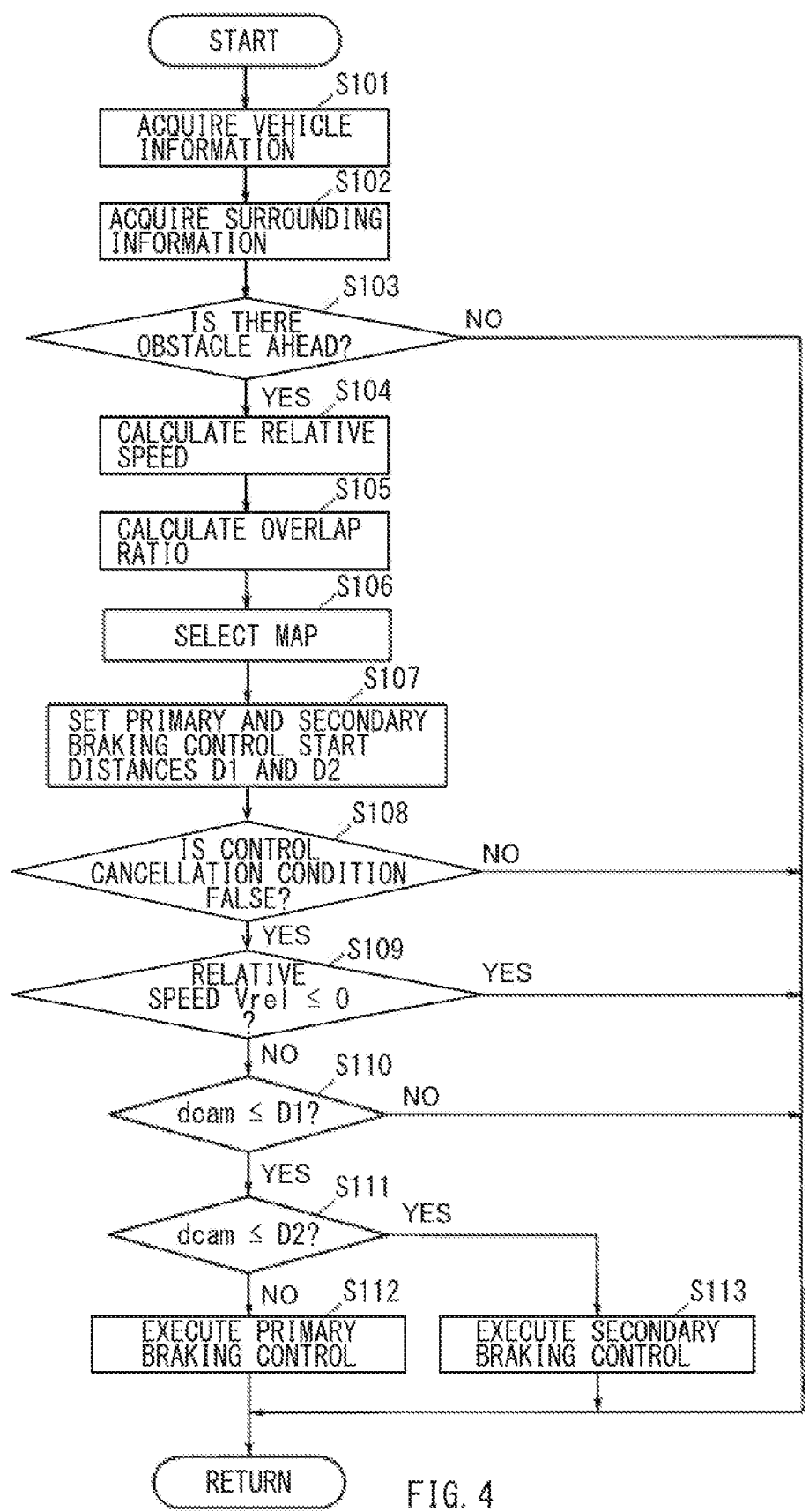
FIG. 4 is a flowchart illustrating an emergency braking control routine.

A description is given next of the emergency braking control to be executed in the traveling ECU 22, with reference to a flowchart of an emergency braking control routine illustrated in FIG. 4. This routine may be executed repeatedly every set time period.

Upon start of the routine, the traveling ECU 22 may acquire information related to the own vehicle M in step S101, and may acquire traveling environment information recognized by the first traveling environment recognizer 11*d* and the second traveling environment recognizer 13*c* in subsequent step S102. The information related to the own vehicle M may also be referred to as own vehicle information. The recognized traveling environment information may also be referred to as surrounding information.

In subsequent step S103, the traveling ECU 22 may check whether an obstacle is present ahead on the own vehicle traveling course.

Upon determining that an obstacle is absent ahead on the own vehicle traveling course in step S103 (S103: NO), the traveling ECU 22 may exit the routine.

Upon determining that an obstacle is present ahead on the own vehicle traveling course in step S103 (S103: YES), the traveling ECU 22 may cause the flow to proceed to step S104, and calculate the relative speed Vrel between the own vehicle M and the obstacle.

Figure 6:
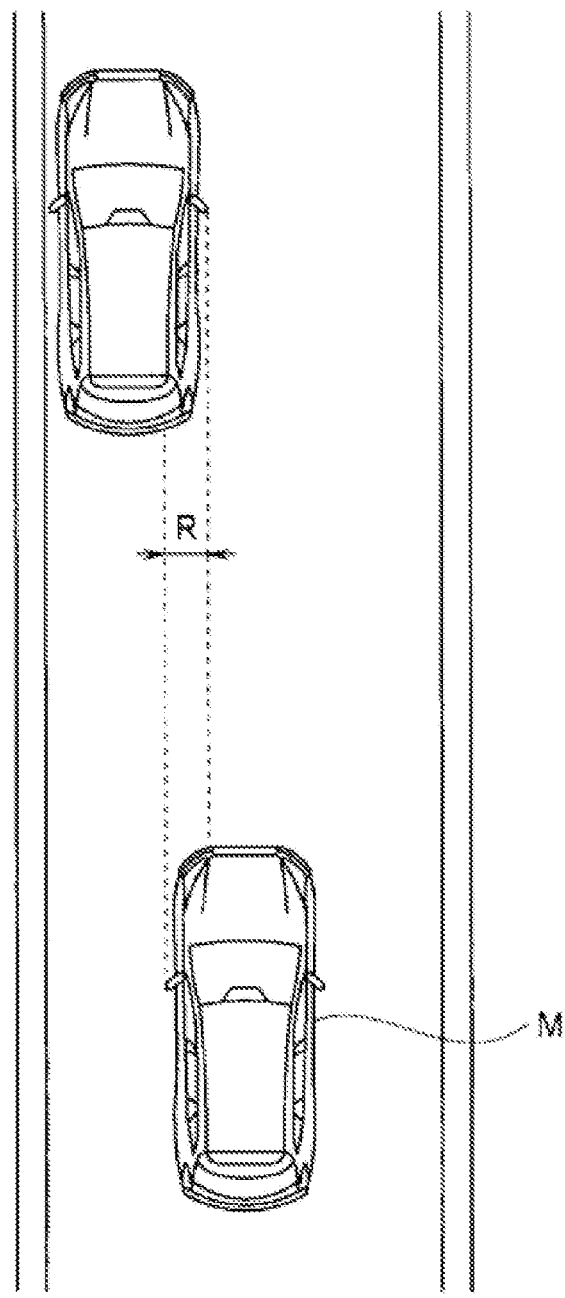
FIG. 6 is an explanatory diagram illustrating an overlap ratio between an own vehicle and an obstacle.

In subsequent step S105, the traveling ECU 22 may calculate the overlap ratio R between the own vehicle M and the obstacle (see FIG. 6).

In subsequent step S106, the traveling ECU 22 may select, on the basis of a preset condition, a map for the setting of the primary braking control start distance and a map for the setting of the secondary braking control start distance, out of the preset plurality of maps.

For example, the traveling ECU 22 may select any one map, out of the preset first to third maps for the setting of the primary braking control start distance, depending on obstacle information or recognized information obtained from the surrounding information, and the own vehicle information.

In addition, the traveling ECU 22 may select any one map, out of the preset first and second maps for the setting of the secondary braking control start distance, depending on a traveling scene, for example. For example, as illustrated in FIG. 12, the traveling ECU 22 may select the first map for the setting of the secondary braking control start distance in a case where at least one of the following requirements is not satisfied: a requirement that the obstacle be a vehicle; a requirement that the own vehicle M be traveling on a main line of an expressway; or a requirement that the road shape, for example, of the own vehicle traveling course recognized by the stereo camera have reliability equal to or greater than the preset reliability with respect to the road map information. For example, the traveling ECU 22 may select the second map for the setting of the secondary braking control start distance in a case where all of the following requirements are satisfied: a requirement that the obstacle be a vehicle; a requirement that the own vehicle M be traveling on a main line of an expressway; or a requirement that the road shape, for example, of the own vehicle traveling course recognized by the stereo camera have reliability equal to or greater than the preset reliability with respect to the road map information.

The flow may proceed to step S107, and the traveling ECU 22 may set the primary braking control start distance D1 and the secondary braking control start distance D2, on the basis of the map for the setting of the primary braking control start distance and the map for the setting of the secondary braking control start distance selected in step S106. For example, the traveling ECU 22 may set the primary braking control start distance D1 and the secondary braking control start distance D2 by using, as parameters, the relative speed Vrel and the overlap ratio R between the own vehicle M and the obstacle, with reference to the map for the setting of the primary braking control start distance and the map for the setting of the secondary braking control start distance.

The flow may proceed from step S107 to step S108, and the traveling ECU 22 may check whether a cancellation condition for the emergency braking control is false. This cancellation condition may include any of various failures. Examples of the various failures may include a case where the traveling environment is not sufficiently recognized by the first traveling environment recognizer 11d due to weather, for example, and a case where a malfunction occurs in the ECUs, for example.

Upon determining that the cancellation condition is true in step S108 (S108: NO), the traveling ECU 22 may exit the routine.

Upon determining that the cancellation condition is false in step S108 (S108: YES), the traveling ECU 22 may cause the flow to proceed to step S109, and check whether the relative speed Vrel is equal to or less than "0", i.e., whether the obstacle is moving at a speed going away from the own vehicle M.

Upon determining that the relative speed Vrel is equal to or less than "0" and the obstacle is moving at a speed going away from the own vehicle M in step S109 (S109: YES), the traveling ECU 22 may exit the routine.

Upon determining that the relative speed Vrel is greater than "0" and the obstacle is moving at a speed approaching the own vehicle M in step S109 (S109: NO), the traveling ECU 22 may cause the flow to proceed to step S110, and check whether a distance dcam from the own vehicle M to the obstacle recognized by the stereo camera is equal to or less than the primary braking control start distance D1.

This distance dcam may also be referred to as a camera distance dcam.

Upon determining that the camera distance dcam is greater than the primary braking control start distance D1 in step S110 (S110: NO), the traveling ECU 22 may exit the routine.

Upon determining that the camera distance dcam is equal to or less than the primary braking control start distance D1 in step S110 (S110: YES), the traveling ECU 22 may cause the flow to proceed to step S111, and check whether the camera distance dcam is equal to or less than the secondary braking control start distance D2.

Upon determining that the camera distance dcam is greater than the secondary braking control start distance D2 in step S111 (S111: NO), the traveling ECU 22 may cause the flow to proceed to step S112, execute the primary braking control, and thereafter exit the routine.

Upon determining that the camera distance dcam is equal to or less than the secondary braking control start distance D2 in step S111 (S111: YES), the traveling ECU 22 may cause the flow to proceed to step S113, execute the secondary braking control, and thereafter exit the routine.

Figure 5:
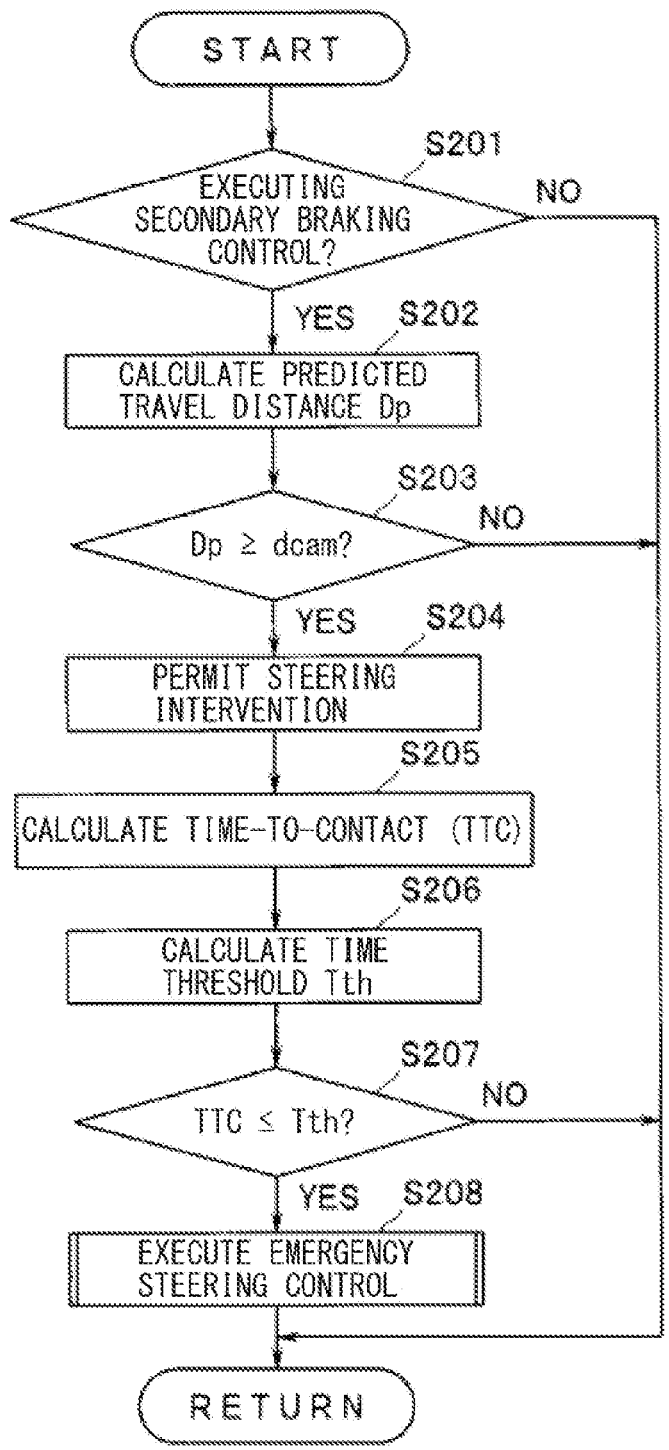
FIG. 5 is a flowchart illustrating an emergency steering control routine.

A description is given next of the emergency steering control to be executed in the traveling ECU 22, with reference to a flowchart of an emergency steering control routine illustrated in FIG. 5. This routine may be executed repeatedly every set time period.

Upon start of the routine, the traveling ECU 22 may check whether the traveling ECU 22 is currently executing the secondary braking control in step S201.

Upon determining that the traveling ECU 22 is not executing the secondary braking control in step S201 (S201: NO), the traveling ECU 22 may exit the routine.

Upon determining that the traveling ECU 22 is executing the secondary braking control in step S201 (S201: YES), the traveling ECU 22 may cause the flow to proceed to step S202, and calculate the predicted travel distance Dp to be traveled until the relative speed between the own vehicle M and the obstacle is reduced to "0" by the secondary braking control.

In subsequent step S203, the traveling ECU 22 may check whether the calculated predicted travel distance Dp is equal to or greater than the camera distance dcam.

Upon determining that the predicted travel distance Dp is less than the camera distance dcam in step S203 (S203: NO), the traveling ECU 22 may exit the routine.

Upon determining that the predicted travel distance Dp is equal to or greater than the camera distance dcam in step S203 (S203: YES), the traveling ECU 22 may cause the flow to proceed to step S204, permit steering intervention, and thereafter cause the flow to proceed to step S205.

In step S205, the traveling ECU 22 may calculate the TTC to be taken until the own vehicle M comes into contact with the obstacle, on the basis of the current traveling state of the own vehicle M. In the calculation of the TTC, the traveling ECU 22 may calculate the TTC by factoring in, for example, the brake pressure increase delay time $t_{pres}$ in the traveling control apparatus 10, the travel time $t_1$ in the deceleration rate increasing section, and the travel time $t_2$ after the deceleration rate is stabilized.

In subsequent step S206, the traveling ECU 22 may calculate the time threshold Tth for the TTC, on the basis of the preset map for the setting of the time threshold for the steering intervention start. For example, the traveling ECU 22 may set the time threshold Tth by using, as parameters, the relative speed Vrel and the overlap ratio R between the own vehicle M and the obstacle, with reference to the map for the setting of the time threshold for the steering intervention start.

In subsequent step S207, the traveling ECU 22 may check whether the calculated TTC is equal to or less than the time threshold Tth.

Upon determining that the TTC is greater than the time threshold Tth in step S207 (S207: NO), the traveling ECU 22 may exit the routine.

Upon determining that the TTC is equal to or less than the time threshold Tth in step S207 (S207: YES), the traveling ECU 22 may cause the flow to proceed to step S208, execute the emergency steering control for the obstacle, and thereafter exit the routine.

Although determination is made on the basis of the camera distance dcam in the example described above, it is also possible to make determination on the basis of the relative distance between the own vehicle M and the obstacle calculated by the radar device.

Note that the maps for the setting of the braking control start distances described above may be generated by the following method, for example.

This map generating method may include the following steps: a step of generating the braking control start distance map under each generation condition, on the basis of an experiment or a simulation performed under a preset generation condition; a step of verifying the generated map by comparison with a limit value map of the braking control start distance; and a step of correcting the braking control start distance of the generated map. Examples of the generation condition may include a traveling condition.

The limit value of the braking control start distance may be a limit value set to leave avoidance of contact with the obstacle in emergency to the driver's active driving operation as much as possible. In other words, the limit value of the braking control start distance may be an upper limit value set to prevent excessive control intervention from being performed even at a timing when contact with the obstacle is avoidable by the driver's driving operation.

The limit value map of the braking control start distance may be, for example, preset on the basis of a normal avoidance steering limit distance Ds and a normal avoidance braking limit distance Db, as described below.

The normal avoidance steering limit distance Ds may be a distance necessary for the driver to perform a normal avoidance steering operation, in the relationship between each of the relative speeds Vrel and each of the overlap ratios R between the own vehicle M and the obstacle. For example, the normal avoidance steering limit distance Ds may be set on the basis of the following expression (6).

$$Ds=(0.0067 \cdot R+1.13) \cdot \text{Vrel} \quad (6)$$

The normal avoidance braking limit distance Db may be a distance necessary for the driver to perform a normal avoidance braking operation, at each of the relative speeds Vrel between the own vehicle M and the obstacle. For example, the normal avoidance braking limit distance Db may be set on the basis of the following expression (7), regardless of the overlap ratio R.

$$Db=(0.00167 \cdot \text{Vrel}+1.00) \cdot \text{Vrel} \quad (7)$$

Figure 16:
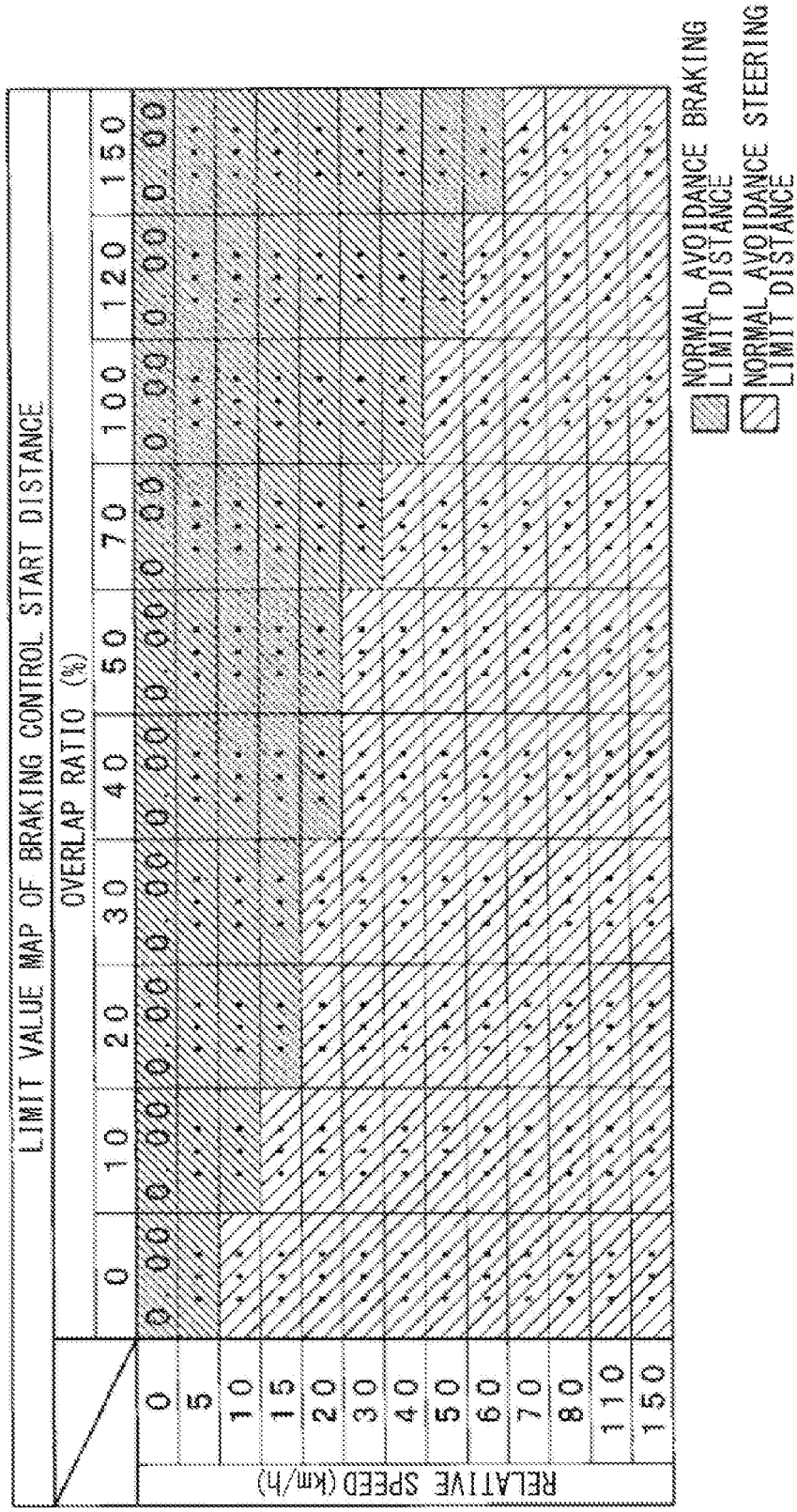
FIG. 16 is a diagram illustrating a limit value map of the braking control start distance.

In the relationship between the relative speed Vrel and the overlap ratio R, the smaller one of the set normal avoidance steering limit distance Ds and normal avoidance braking limit distance Db may be selected as the limit value of the braking control start distance, to thereby generate the limit value map of the braking control start distance (see FIG. 16). This allows the limit value map of the braking control start distance to take avoidance of contact with the obstacle by the emergency steering control into consideration as well.

Figure 15:
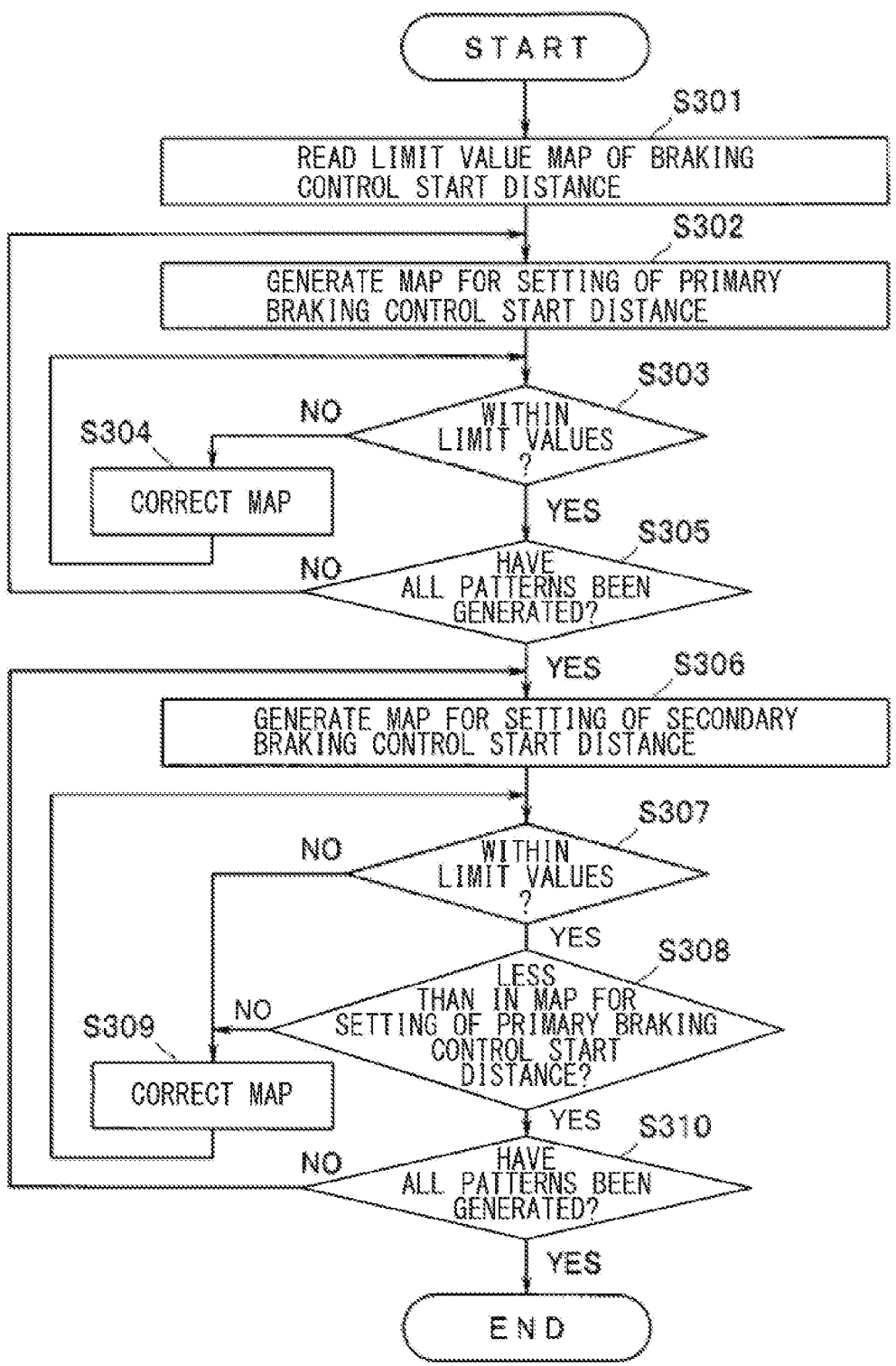
FIG. 15 is a flowchart illustrating a method of generating the maps for the setting of the braking control start distances.

A description is given next of an example method of generating the maps for the setting of the braking control start distances, with reference to a flowchart, illustrating map generating steps, of FIG. 15. For example, this map generating method may generate the first to third maps as the maps for the setting of the primary braking control start distance, and may generate the first and second maps as the maps for the setting of the secondary braking control start distance.

In this map generating method, the preset limit value map of the braking control start distance may be acquired in step S301.

In subsequent step S302, a map for the setting of the primary braking control start distance may be generated on the basis of a preset generation condition. For example, an experiment or a simulation may be performed under the selected generation condition by using a vehicle loaded to maximum loading capacity in weight. The map for the setting of the primary braking control start distance under the generation condition may be generated on the basis of a result of the experiment or the simulation.

In subsequent step S303, it may be determined whether values of the map for the setting of the primary braking control start distance generated in step S302 fall within corresponding values of the limit value map of the braking control start distance acquired in step S301.

In a case where it is determined in step S303 that at least one of the values of the map for the setting of the primary braking control start distance does not fall within the corresponding values of the limit value map of the braking control start distance (S303: NO), the flow may proceed to step S304. The map for the setting of the primary braking control start distance may be corrected in step S304, and thereafter the flow may return to step S303.

In a case where it is determined in step S303 that the values of the map for the setting of the primary braking control start distance fall within the corresponding values of the limit value map of the braking control start distance (S303: YES), the flow may proceed to step S305. It may be determined in step S305 whether the maps of all patterns, i.e., the first to third maps, have been generated as the maps for the setting of the primary braking control start distance.

In a case where it is determined in step S305 that maps of all patterns have not been generated (S305: NO), the flow may return to step S302, and a map for the setting of the primary braking control start distance may be generated on the basis of a new generation condition.

In a case where it is determined in step S305 that maps of all patterns have been generated (S305: YES), the flow may proceed to step S306, and a map for the setting of the secondary braking control start distance may be generated on the basis of a preset generation condition. For example, an experiment or a simulation may be performed under the selected generation condition by using a vehicle loaded to maximum loading capacity in weight. The map for the setting of the secondary braking control start distance under the generation condition may be generated on the basis of a result of the experiment or the simulation.

In subsequent step S307, it may be determined whether values of the map for the setting of the secondary braking control start distance generated in step S305 fall within values of the limit value map of the braking control start distance acquired in step S301.

In a case where it is determined in step S307 that at least one of the values of the map for the setting of the secondary braking control start distance does not fall within the corresponding values of the limit value map of the braking control start distance (S307: NO), the flow may proceed to step S309.

In a case where it is determined in step S307 that the values of the map for the setting of the secondary braking control start distance fall within the values of the limit value map of the braking control start distance (S307: YES), the flow may proceed to step S308. It may be determined in step S308 whether the values of the map for the setting of the secondary braking control start distance are less than the corresponding values of the maps for the setting of the primary braking control start distance.

In a case where it is determined in step S308 that the values of the map for the setting of the secondary braking control start distance are less than the corresponding values of the maps for the setting of the primary braking control start distance (S308: YES), the flow may proceed to step S310. In a case where it is determined in step S308 that at least one of the values of the map for the setting of the secondary braking control start distance is not less than the corresponding values of the maps for the setting of the primary braking control start distance (S308: NO), the flow may proceed to step S309.

In a case where the flow proceeds from step S307 or step S308 to step S309, the map for the setting of the secondary braking control start distance may be corrected, and thereafter the flow may return to step S307.

In a case where the flow proceeds from step S308 to step S310, it may be determined whether the maps of all patterns, i.e., the first and second maps, have been generated as the maps for the setting of the secondary braking control start distance.

In a case where it is determined in step S310 that maps of all patterns have not been generated (S310: NO), the flow may return to step S306, and a map for the setting of the secondary braking control start distance may be generated on the basis of a new generation condition.

In a case where it is determined in step S310 that maps of all patterns have been generated (S310: YES), the map generating steps may be ended.

Figure 17:
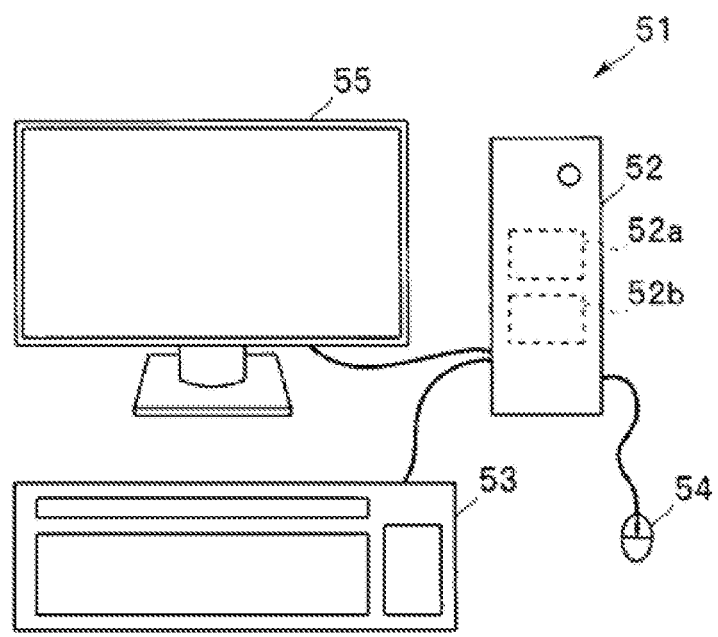
FIG. 17 is a schematic configuration diagram illustrating an apparatus that generates the maps for the setting of the braking control start distances.

Note that the steps of such map generation may partly or wholly be performed by, for example, a map generation apparatus 51 illustrated in FIG. 17. The map generation apparatus 51 illustrated in FIG. 17 may include a computer, for example. The map generation apparatus 51 may mainly include a computer body 52, a keyboard 53 serving as a key input device, a mouse 54 serving as a pointing device, and a monitor 55 serving as a display. The computer body 52 may include a central processing unit (CPU) 52a and a storage 52b that stores various data and programs. The keyboard 53, the mouse 54, and the monitor 55 may be coupled to the computer body 52.

According to at least one of the example embodiments, the traveling ECU 22 may have the first map and the second map stored therein as the maps for the setting of the threshold for the start of the secondary braking control, i.e., the secondary braking control start distance. The secondary braking control may serve as the strong braking control. The first map may allow the threshold to be set on the basis of the relative speed Vrel between the own vehicle M and the obstacle. The second map may allow the threshold in the high-speed range of the relative speed Vrel to be set to a larger value than in the first map. The traveling ECU 22 may set the threshold on the basis of the second map in a case where the own vehicle M is traveling on an expressway and where the obstacle is a vehicle. The traveling ECU 22 may set the threshold on the basis of the first map in a case where at least one of the following requirements is not satisfied: the requirement that the own vehicle M be traveling on an expressway; or the requirement that the obstacle be a vehicle. This makes it possible to increase cases where contact with the obstacle is avoidable even in the high-speed range, while suppressing early intervention of the emergency braking control.

In other words, the secondary braking control may be executed at a start timing based on the secondary braking control start distance set by using the first map in which the intervention timing is suppressed, in a case where at least one of the following requirements is not satisfied: the requirement that the own vehicle M be traveling on an expressway; or the requirement that the obstacle be a vehicle. This makes it possible to suppress early intervention of the secondary braking control. In a case where the own vehicle M is traveling on an expressway and where the obstacle is a vehicle, the secondary braking control may be executed at a start timing based on the secondary braking control start distance set by using the second map in which the intervention timing in the high-speed range is made earlier than that in the first map. This makes it possible to increase cases where contact with the obstacle is avoidable even in the high-speed range.

Also in the primary braking control, different maps, e.g., first to third maps, corresponding to traveling scenes, for example, may be used. This makes it possible to execute the primary braking control at an appropriate timing, while suppressing early intervention of the primary braking control.

In this case, the maps may allow the threshold to be set to a smaller value to delay the control intervention timing as the overlap ratio R between the own vehicle M and the obstacle becomes lower. This makes it possible to execute the emergency braking control at an appropriate timing taking avoidance of contact with the obstacle by steering into consideration as well.

In addition, the maps may be configured to set, as the threshold, a value that falls below the limit value of the limit value map of the braking control start distance. This limit value map may be preset on the basis of a normal steering timing for the driver to avoid contact with the obstacle by steering, and a normal braking timing for the driver to avoid contact with the obstacle by braking. This makes it possible to execute the emergency braking control at an appropriate timing, while leaving room for an obstacle avoidance operation performed by the driver.

According to at least one of the example embodiments, the traveling ECU 22 calculates, while executing the secondary braking control serving as the strong braking control, the predicted travel distance Dp to be traveled until the relative speed with respect to the obstacle is reduced to "0" by the secondary braking control. In a case where the predicted travel distance Dp is longer than the relative distance dcam with respect to the obstacle, the traveling ECU 22 permits steering intervention for avoidance of contact with the obstacle. In addition, the traveling ECU 22 calculates, while executing the secondary braking control, the time-to-contact (TTC) to be taken until the own vehicle M comes into contact with the obstacle. In a case where the steering intervention is permitted and where the time-to-contact becomes equal to or less than the time threshold Tth, the traveling ECU 22 executes the emergency steering control for avoidance of contact with the obstacle. This makes it possible to cause the emergency steering control to intervene at an appropriate timing in a case where the secondary braking control is performed.

In other words, the emergency steering control may not be executed immediately when it is determined that the predicted travel distance Dp immediately after the intervention of the secondary braking control is longer than the relative distance dcam with respect to the obstacle. Instead, the emergency steering control may be executed at a timing when the TTC calculated additionally becomes equal to or less than the time threshold. This makes it possible to suppress early intervention of the emergency steering control. This helps to execute the emergency steering control at an appropriate timing, while leaving room for avoidance steering, for example, performed by the driver even in a case where the emergency braking control is executed.

In this case, the calculation of the predicted travel distance Dp may be performed by factoring in the distance that is traveled by the own vehicle M during each of the recognition delay time attributed to the autonomous sensors, the brake pressure increase delay time in the secondary braking control, and the time that is taken for the deceleration rate to increase to the target deceleration rate in the secondary braking control. This makes it possible to more precisely determine whether to permit the steering intervention.

The calculation of the TTC may be performed by factoring in each of the recognition delay time attributed to the autonomous sensors, the brake pressure increase delay time in the secondary braking control, and the time that is taken for the deceleration rate to increase to the target deceleration rate in the secondary braking control. This enables, intervention of the emergency steering control at a more precise timing.

In the example embodiments described above, the traveling environment recognition unit 11, the locator unit 12, the traveling ECU 22, the E/G ECU 23, the PS ECU 24, the BK ECU 25, the road map information integration ECU 101, and the computer body 52 may include a known microcomputer and peripheral equipment thereof. The known microcomputer may include a CPU, a RAM, a ROM, and a nonvolatile storage, for example. The ROM may store, in advance, fixed data such as a program to be executed by the CPU or a data table. All or a part of functions of the traveling environment recognition unit 11, the locator unit 12, the traveling ECU 22, the E/G ECU 23, the PS ECU 24, the BK ECU 25, the road map information integration ECU 101, and the computer body 52 may be configured by a logic circuit or an analog circuit. Processing of various programs may be implemented by an electronic circuit such as a FPGA.

The technology described above is not limited to the foregoing example embodiments, and various modifications may be made in the implementation stage without departing from the gist of the technology. Further, the foregoing example embodiments each include various stages of the technology, and various technologies may be extracted by appropriately combining the features of the technology disclosed herein.

For example, in a case where the above-described concerns may be addressed and the above-described effects may be obtained even if some features are deleted from all the features disclosed herein, the remaining features may be extracted as a technology.

The traveling ECU 22 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling ECU 22. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the traveling ECU 22 illustrated in FIG. 1.

The invention claimed is:

1. A vehicle traveling control apparatus comprising:
    an autonomous sensor configured to recognize an obstacle ahead of a vehicle;
    a braking controller configured to
        determine whether the vehicle is likely to come into contact with the obstacle based on determining that the obstacle is present, and a relative distance and a relative speed between the vehicle and the obstacle,
        in response to determining that the vehicle is likely to come into contact with the obstacle, determine whether a distance from the vehicle to the obstacle is equal to or less than a predetermined threshold,
        in response to determining that the distance from the vehicle to the obstacle is greater than the predetermined threshold, execute a primary braking control based on a first deceleration rate, and
        in response to determining that the distance from the vehicle to the obstacle is equal to or less than the predetermined threshold while the primary braking control is being executed, execute a secondary braking control of reducing the relative speed to "0" based on a second deceleration rate higher than the first deceleration rate during the primary braking control;
    a determination unit configured to, during the execution of the secondary braking control:
        calculate a predicted travel distance to be traveled until the relative speed with respect to the obstacle is reduced to "0" by the secondary braking control, permit steering intervention for avoidance of contact with the obstacle in a case where the predicted travel distance is longer than the relative distance, calculate an overlap ratio between the vehicle and the obstacle in a width direction of the vehicle, and determine, after permitting the steering intervention, a time threshold for a start of the steering intervention by using (i) the relative speed between the vehicle and the obstacle and (ii) the overlap ratio;

a calculator configured to, during the execution of the secondary braking control, calculate time-to-contact to be taken until the vehicle comes into contact with the obstacle based on a difference between the second deceleration rate and the first deceleration rate; and a steering controller configured to, during the execution of the secondary braking control:

execute a steering control for the avoidance of the contact with the obstacle in a case where the determination unit determines that the time-to-contact becomes equal to or less than the time threshold; and cancel the steering control for the avoidance of the contact with the obstacle in a case where the determination unit determines that the time-to-contact becomes greater than the time threshold, wherein the time threshold is configured to delay the start of the steering intervention by setting the time threshold to a smaller value as the relative speed becomes lower, and setting the time threshold to a smaller value as the overlap ratio becomes lower.

2. The vehicle traveling control apparatus according to claim 1, wherein the calculator is configured to calculate the time-to-contact based on adding brake pressure increase delay time in the secondary braking control to time that is taken for the deceleration rate to increase to the second deceleration rate in the secondary braking control.

3. The vehicle traveling control apparatus according to claim 2, wherein the determination unit is configured to calculate the predicted travel distance, summing the first distance, the second distance, the third distance and a preset margin distance.

4. The vehicle traveling control apparatus according to claim 3, wherein the braking controller is configured to delay an intervention timing of the secondary braking control, with a decrease in the overlap ratio between the vehicle and the obstacle in a width direction of the vehicle.

5. The vehicle traveling control apparatus according to claim 2, wherein the braking controller is configured to delay an intervention timing of the secondary braking control, with a decrease in the overlap ratio between the vehicle and the obstacle in a width direction of the vehicle.

6. The vehicle traveling control apparatus according to claim 1, wherein the determination unit is configured to calculate the predicted travel distance, by summing the first distance, the second distance, the third distance and a preset margin distance.

7. The vehicle traveling control apparatus according to claim 6, wherein the braking controller is configured to delay an intervention timing of the secondary braking control, with a decrease in the overlap ratio between the vehicle and the obstacle in a width direction of the vehicle.

8. The vehicle traveling control apparatus according to claim 1, wherein the braking controller is configured to delay an intervention timing of the secondary braking control, with a decrease in the overlap ratio between the vehicle and the obstacle in a width direction of the vehicle.

9. The vehicle traveling control apparatus of claim 1, further comprising a grid chart for setting the time threshold, the grid chart comprising a column axis, a row axis, a plurality of decreasing relative speed values as one of the column axis and the row axis of the grid chart, a plurality of decreasing overlap ratio values as the other of the column axis and the row axis of the grid chart, and a plurality of time threshold values as grid cells of the grid chart, wherein as the relative speed values decrease along the one of the column axis or the row axis, the time threshold values in corresponding grid cells decrease, and as the overlap ratio values decrease along the other of the column axis or the row axis, the time threshold values in corresponding grid cells of the grid chart decrease.

10. The vehicle traveling control apparatus of claim 1, wherein the determination unit is configured to calculate the predicted travel distance based on:

deriving a first distance that is traveled by the vehicle during recognition delay time attributed to the autonomous sensor;

deriving a second distance that is traveled by the vehicle during time that is taken for a deceleration rate to increase from the first deceleration rate to the second deceleration rate in the secondary braking control based on a maximum jerk of the deceleration rate the difference between the second deceleration rate and the first deceleration rate;

deriving a third distance that is traveled by the vehicle during travel time after the deceleration rate is stabilized until the relative speed becomes zero based on the target deceleration rate among the target deceleration rate of the vehicle and the maximum jerk of the deceleration rate; and summing the first distance, the second distance, and the third distance, the sum of the first distance, the second distance, and the third distance being the predicted travel distance.

11. The vehicle traveling control apparatus according to claim 1, wherein the calculator is configured to calculate the time-to-contact based on calculating time that is taken for increasing the deceleration rate from the first deceleration rate to the second deceleration rate based on the difference between the second deceleration rate and the first deceleration rate.

12. A vehicle traveling control apparatus comprising:

an autonomous sensor configured to recognize an obstacle ahead of a vehicle; and circuitry configured to determine whether the vehicle is likely to come into contact with the obstacle based on determining that the obstacle is present, and a relative distance and a relative speed between the vehicle and the obstacle, in response to determining that the vehicle is likely to come into contact with the obstacle, determine whether a distance from the vehicle to the obstacle is equal to or less than a predetermined threshold, in response to determining that the distance from the vehicle to the obstacle is greater than the predetermined threshold, execute a primary braking control, in response to determining that the distance from the vehicle to the obstacle is equal to or less than the predetermined threshold while the primary braking control is being executed, execute a strong secondary braking control of reducing the relative speed to "0" based on a second deceleration rate higher than the first deceleration rate during the primary braking control, calculate, during the execution of the secondary braking control, a predicted travel distance to be traveled until the relative speed with respect to the obstacle is reduced to "0" by the secondary braking control, permit, during the execution of the secondary braking control, steering intervention for avoidance of contact with the obstacle in a case where the predicted travel distance is longer than the relative distance, calculate, during the execution of the secondary braking control, an overlap ratio between the vehicle and the obstacle in a width direction of the vehicle, determine, after permitting the steering intervention, a time threshold for starting the steering intervention by using (i) the relative speed between the vehicle and the obstacle and (ii) the overlap ratio, calculate, during the execution of the secondary braking control, time-to-contact to be taken until the vehicle comes into contact with the obstacle based on a difference between the second deceleration rate and the first deceleration rate, execute, during the execution of the secondary braking control, a steering control for the avoidance of the contact with the obstacle based on determining that the time-to-contact becomes equal to or less than the time threshold, and cancel, during the execution of the secondary braking control, the steering control for the avoidance of the contact with the obstacle based on determining that the time-to-contact becomes greater than the time threshold, wherein the time threshold is configured to delay the start of the steering intervention by setting the time threshold to a smaller value as the relative speed becomes lower, and setting the time threshold to a smaller value as the overlap ratio becomes lower.

13. The vehicle traveling control apparatus of claim 12, wherein the circuitry is further configured to store a grid chart for setting the time threshold, the grid chart comprising a column axis, a row axis, a plurality of decreasing relative speed values as one of the column axis and the row axis of the grid chart, a plurality of decreasing overlap ratio values as the other of the column axis and the row axis of the grid chart, and a plurality of time threshold values as grid cells of the grid chart, wherein as the relative speed values decrease along the one of the column axis or the row axis, the time threshold values in corresponding grid cells decrease, and as the overlap ratio values decrease along the other of the column axis or the row axis, the time threshold values in corresponding grid cells of the grid chart decrease.

14. The vehicle traveling control apparatus of claim 12, wherein the circuitry is configured to calculate the predicted travel distance based on:

deriving a first distance that is traveled by the vehicle during recognition delay time attributed to the autonomous sensor;

deriving a second distance that is traveled by the vehicle during time that is taken for a deceleration rate to increase from the first deceleration rate to the second deceleration rate in the secondary braking control based on a maximum jerk of the deceleration rate and the difference between the second deceleration rate and the first deceleration rate;

deriving a third distance that is traveled by the vehicle during travel time after the deceleration rate is stabilized until the relative speed becomes zero based on the target deceleration rate among the target deceleration rate of the vehicle and the maximum jerk of the deceleration rate; and summing the first distance, the second distance, and the third distance, the sum of the first distance, the second distance, and the third distance being the predicted travel distance.

15. The vehicle traveling control apparatus according to claim 12, wherein the circuitry is configured to calculate the time-to-contact based on calculating time that is taken for increasing the deceleration rate from the first deceleration rate to the second deceleration rate based on the difference between the second deceleration rate and the first deceleration rate.

\* \* \* \* \*